US009693297B2

(12) United States Patent
Condeixa et al.

(10) Patent No.: US 9,693,297 B2
(45) Date of Patent: Jun. 27, 2017

(54) SYSTEMS AND METHODS FOR DELAY TOLERANT NETWORKING IN A NETWORK OF MOVING THINGS, FOR EXAMPLE INCLUDING A NETWORK OF AUTONOMOUS VEHICLES

(71) Applicant: Veniam, Inc., Mountain View, CA (US)

(72) Inventors: Tiago Condeixa, Vagos (PT); Joao Azevedo, Felgueiras (PT); Carlos Ameixiera, Oporto (PT); Ricardo Matos, Oporto (PT); Roy Russell, Cambridge, MA (US); Joao Barros, Mountain View, CA (US)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 15/353,966

(22) Filed: Nov. 17, 2016

(65) Prior Publication Data

US 2017/0149901 A1 May 25, 2017

Related U.S. Application Data

(60) Provisional application No. 62/257,421, filed on Nov. 19, 2015.

(51) Int. Cl.
*H04L 1/08* (2006.01)
*H04W 48/20* (2009.01)
*H04L 29/08* (2006.01)
*H04W 88/08* (2009.01)
*H04W 88/10* (2009.01)
*H04L 29/12* (2006.01)

(52) U.S. Cl.
CPC .............. *H04W 48/20* (2013.01); *H04L 1/08* (2013.01); *H04L 67/12* (2013.01); *H04L 29/12707* (2013.01); *H04W 88/08* (2013.01); *H04W 88/10* (2013.01)

(58) Field of Classification Search
CPC .......... H04L 67/12; H04L 1/08; H04W 40/02; H04W 48/20; H04W 88/08; H04W 88/10
See application file for complete search history.

(56) References Cited

U.S. PATENT DOCUMENTS 8,457,546 B2 * 6/2013 Mahajan ............... H04W 40/02
370/315
8,542,636 B2 * 9/2013 Qiu .................... H04W 72/1236
370/328

(Continued)

OTHER PUBLICATIONS

Chen et al., Impact of transmission power on TCP performance in vehicular Ad Hoc Networks, 2007, Citeseer, pp. 1 to 7.*

(Continued)

*Primary Examiner* — Shelly A Chase
(74) *Attorney, Agent, or Firm* — McAndrews, Held & Malloy, Ltd.

(57) ABSTRACT

Systems and methods for optimizing data communication in a network of moving things. As non-limiting examples, various aspects of this disclosure provide systems and methods for communicating delay tolerant information in a network of moving things, for example comprising any of a variety of types of vehicles (e.g., autonomous vehicles, vehicles controlled by local operators, vehicles controlled by remote operators, etc.).

24 Claims, 16 Drawing Sheets

(56) References Cited

U.S. PATENT DOCUMENTS

| | | | |
|---|---|---|---|
| 8,681,773 B2* | 3/2014 | Chazel | B61L 15/0027 |
| | | | 370/351 |
| 9,237,479 B2* | 1/2016 | Ma | H04W 28/0231 |
| 2006/0068795 A1 | 3/2006 | Caspi et al. | |
| 2007/0183394 A1 | 8/2007 | Khandelwal et al. | |
| 2013/0190963 A1 | 7/2013 | Kuss et al. | |
| 2014/0282747 A1 | 9/2014 | Richman et al. | |
| 2015/0029987 A1 | 1/2015 | Addepalli et al. | |

OTHER PUBLICATIONS

International Search Report and Written Opinion corresponding to International Patent Application No. PCT/US2016/62471, mailed Jan. 30, 2017.

* cited by examiner

SYSTEMS AND METHODS FOR DELAY TOLERANT NETWORKING IN A NETWORK OF MOVING THINGS, FOR EXAMPLE INCLUDING A NETWORK OF AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Application Ser. No. 62/257,421, filed on Nov. 19, 2015, and titled "Systems and Methods for Delay Tolerant Networking in a Network of Moving Things," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving moving networks. As a non-limiting example, current communication networks are unable to adequately support a network comprising a complex array of both moving and static nodes, some of which may be network access points (e.g., the Internet of moving things) interacting with sensor systems. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
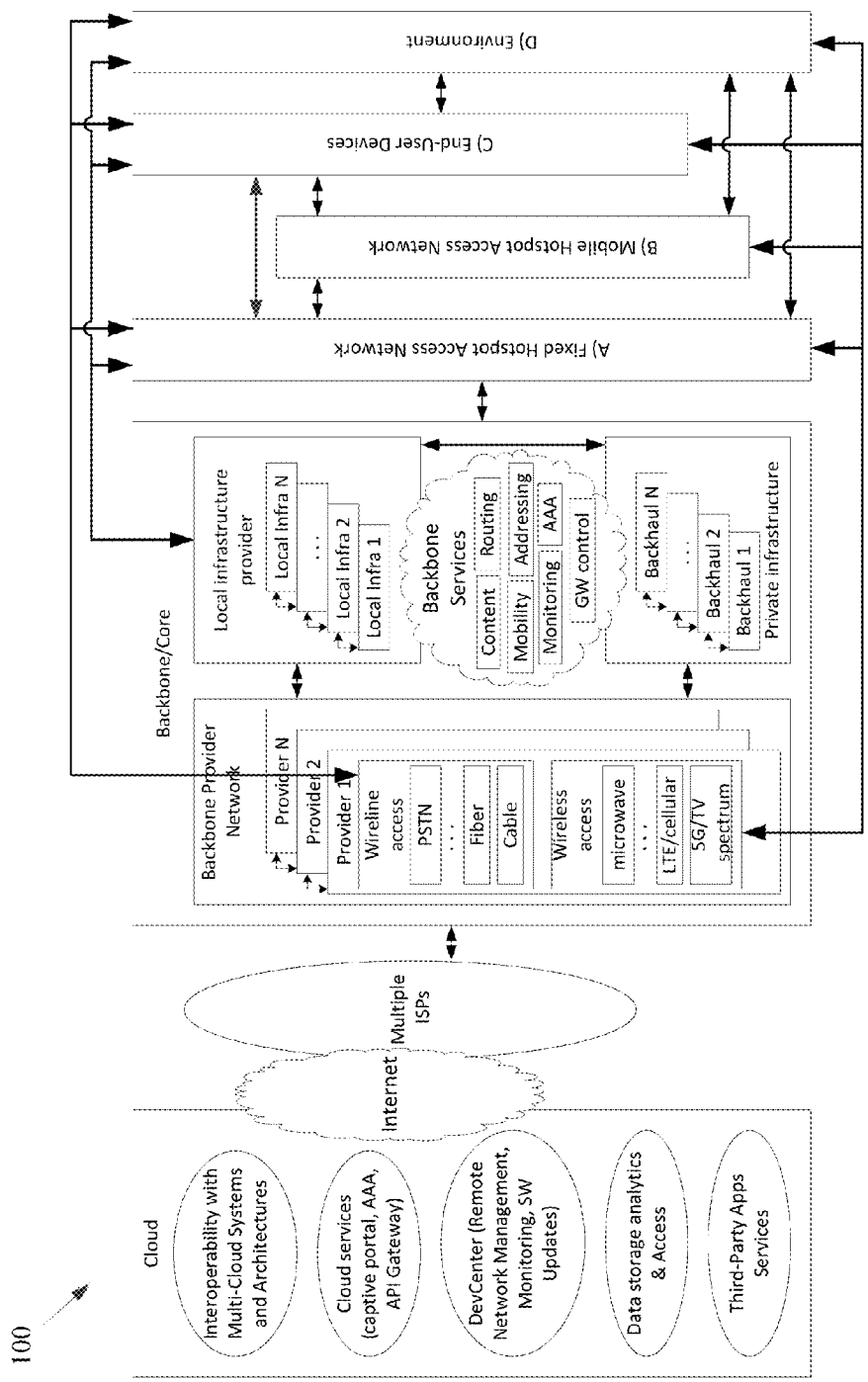
FIG. 1 shows a block diagram of a communication network, in accordance with various aspects of this disclosure.

Various aspects of this disclosure provide systems and methods for optimizing data communication in a network of moving things. As non-limiting examples, various aspects of this disclosure provide systems and methods for communicating delay tolerant information in a network of moving things, for example comprising any of a variety of types of vehicles (e.g., autonomous vehicles, vehicles controlled by local operators, vehicles controlled by remote operators, etc.).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper,"

"lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, networks and/or network components 200, 300, 400, 500-570, 600, 700, 800, 900, 1000, 1100, 1200, 1300, 1400, and 1500, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
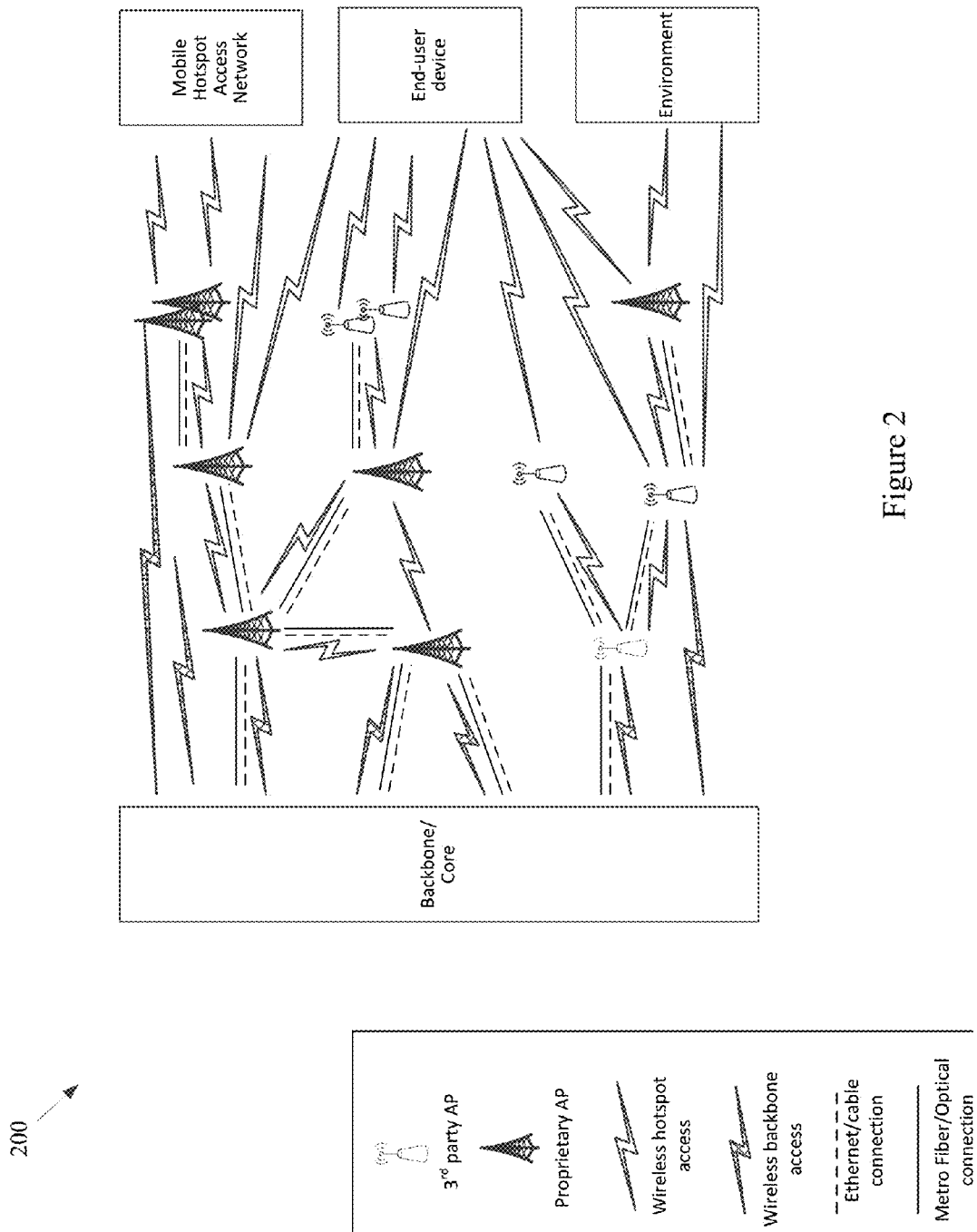
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, networks and/or network components 100, 300, 400, 500-570, 600, 700, 800, 900, 1000, 1100, 1200, 1300, 1400, and 1500, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors; traffic management networks, devices, and sensors; advertising networks, devices and sensors; etc.).

Figure 3:
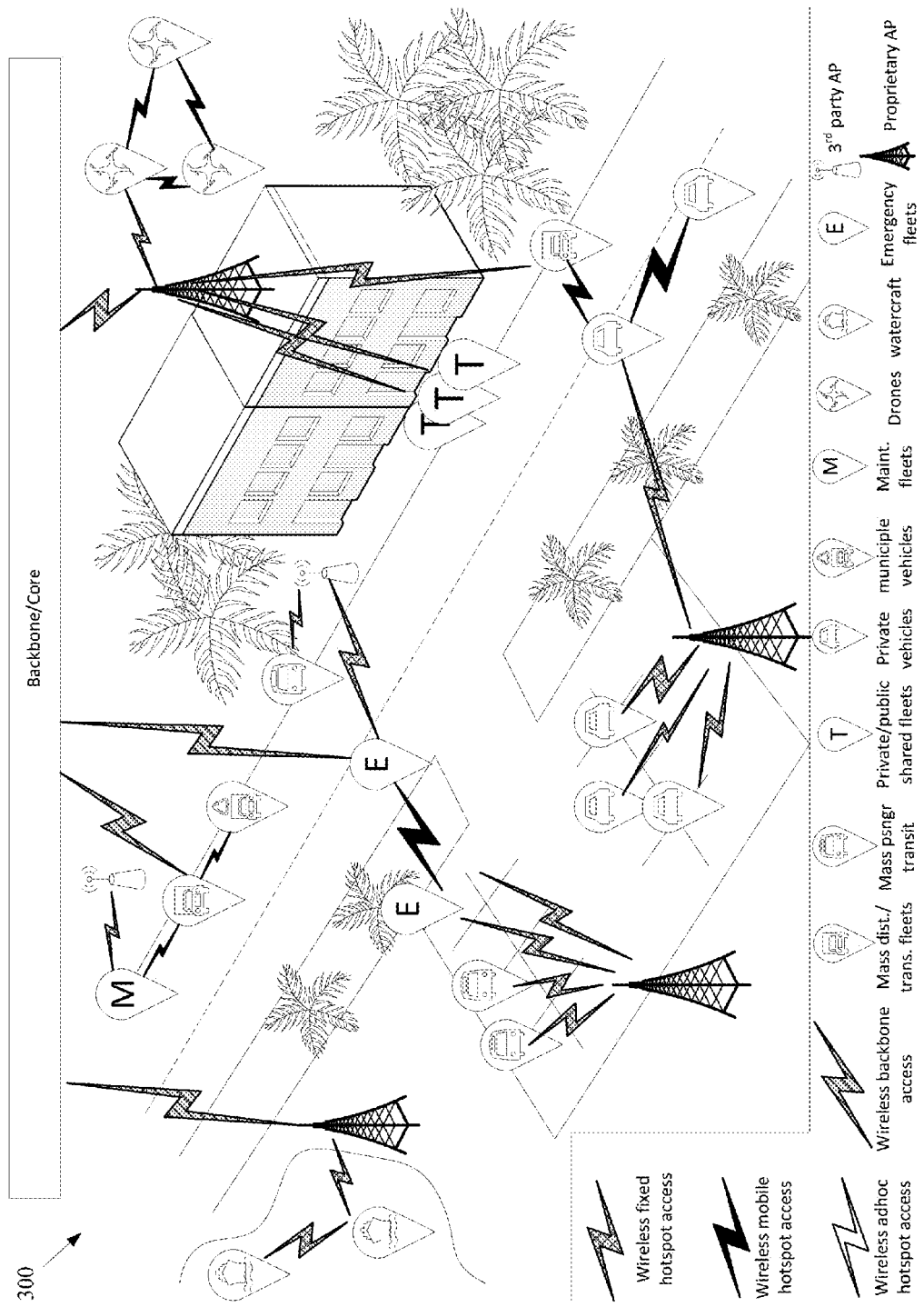
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, networks and/or network components 100, 200, 400, 500-570, 600, 700, 800, 900, 1000, 1100, 1200, 1300, 1400, and 1500, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
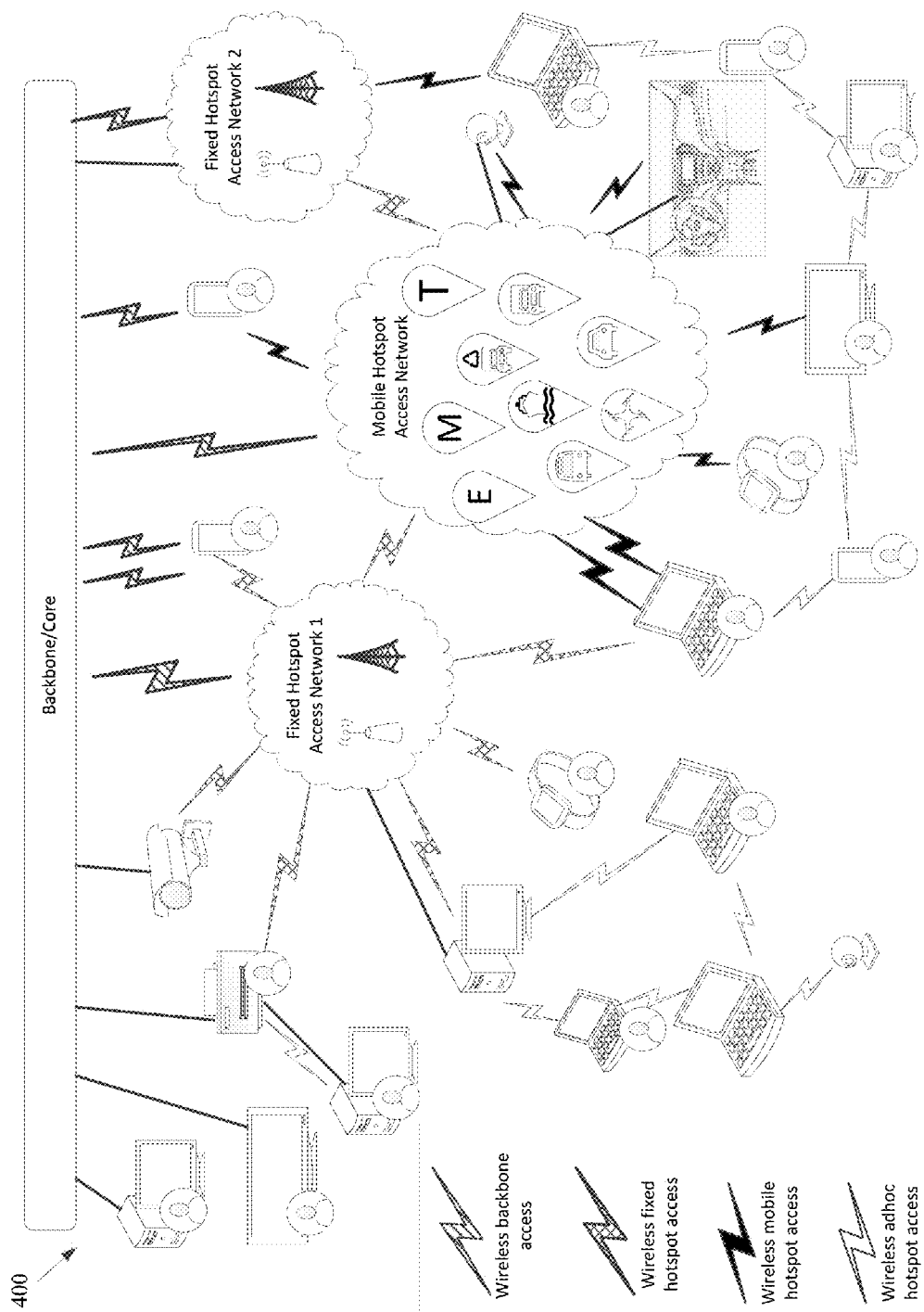
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, networks and/or network components 100, 200, 300, 500-570, 600, 700, 800, 900, 1000, 1100, 1200, 1300, 1400, and 1500, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
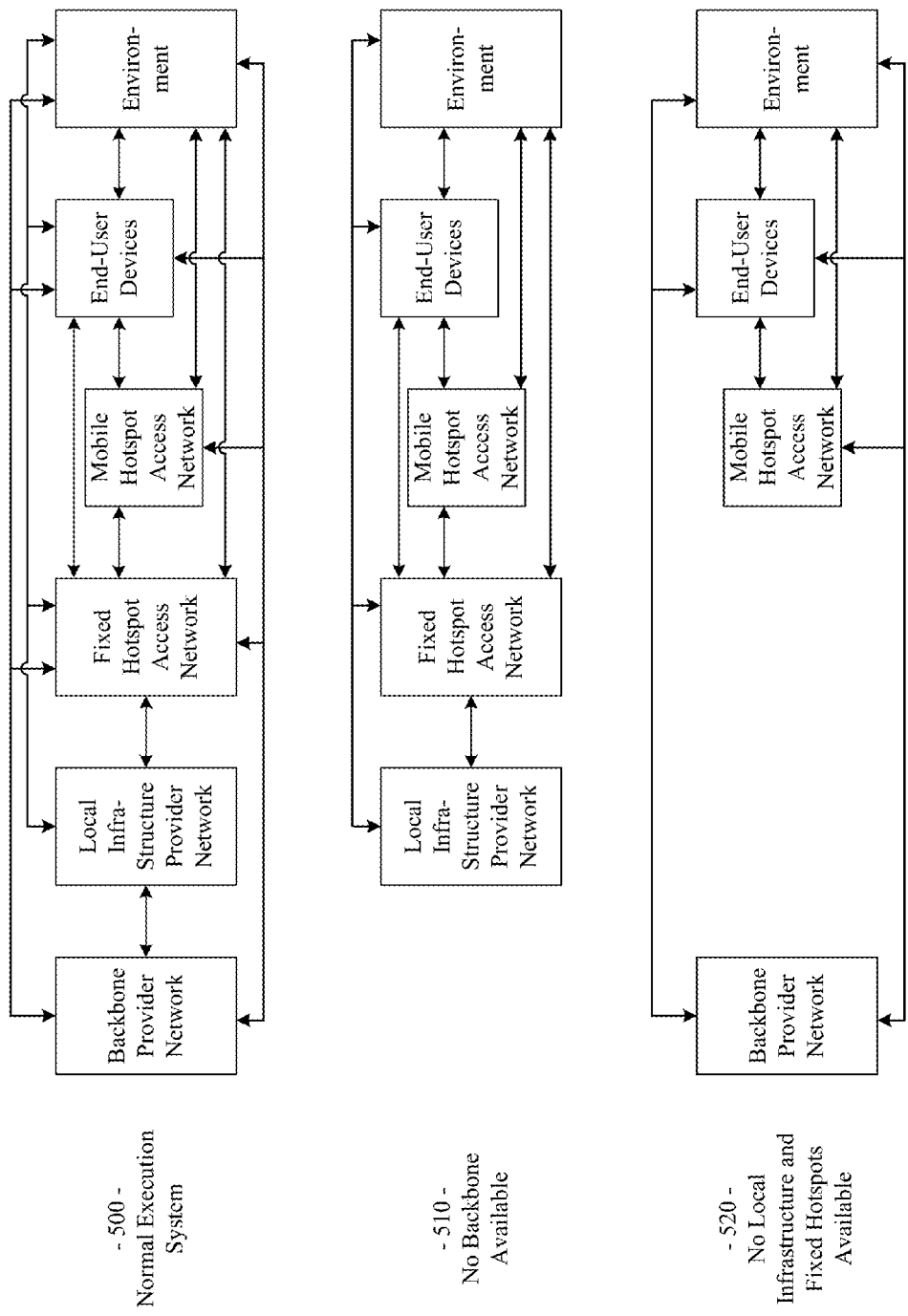
FIGS. 5A-5C show a plurality of network configurations illustrating the flexibility and/or and resiliency of a communication network, in accordance with various aspects of this disclosure.
Figure 5B:
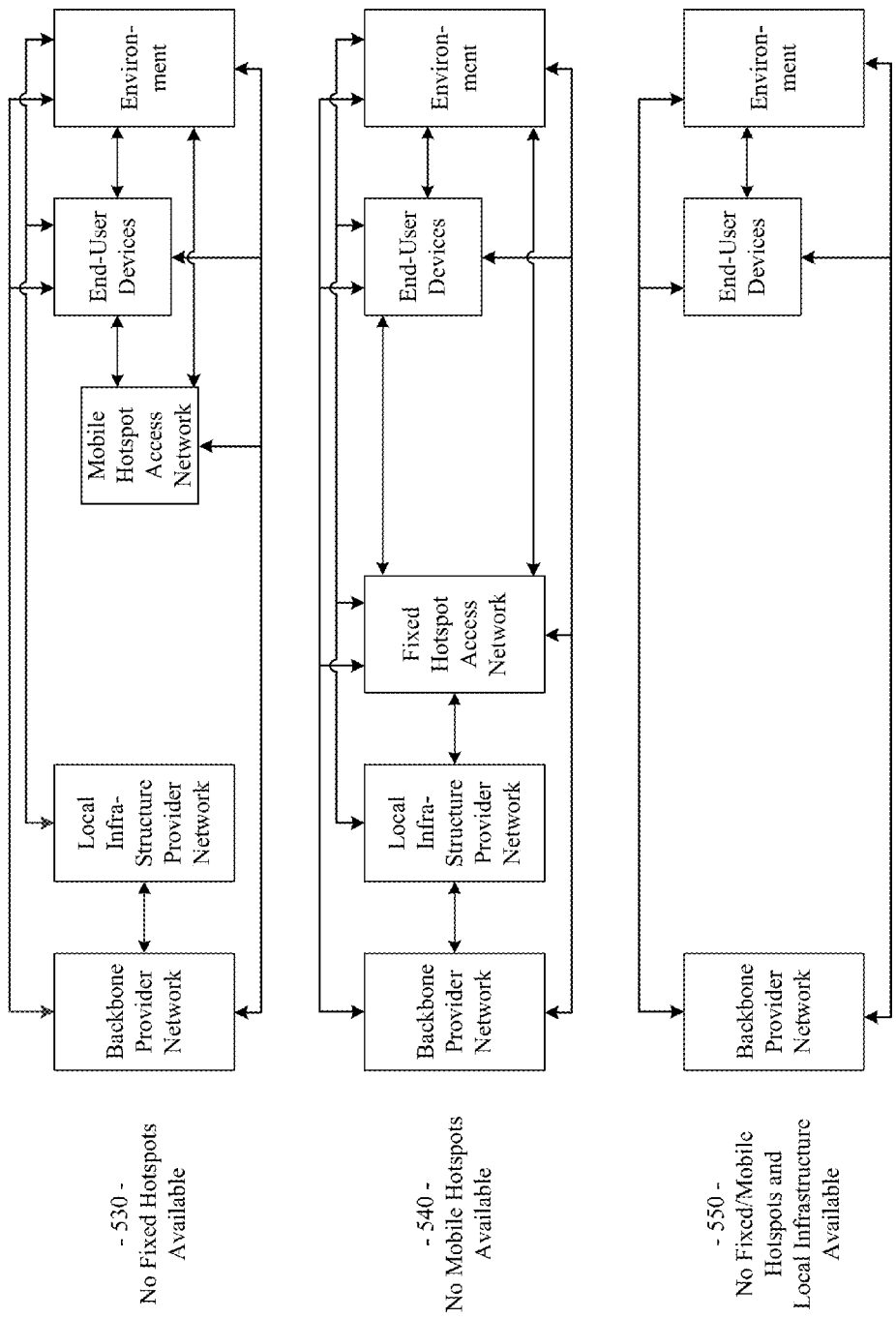
Figure 5C:
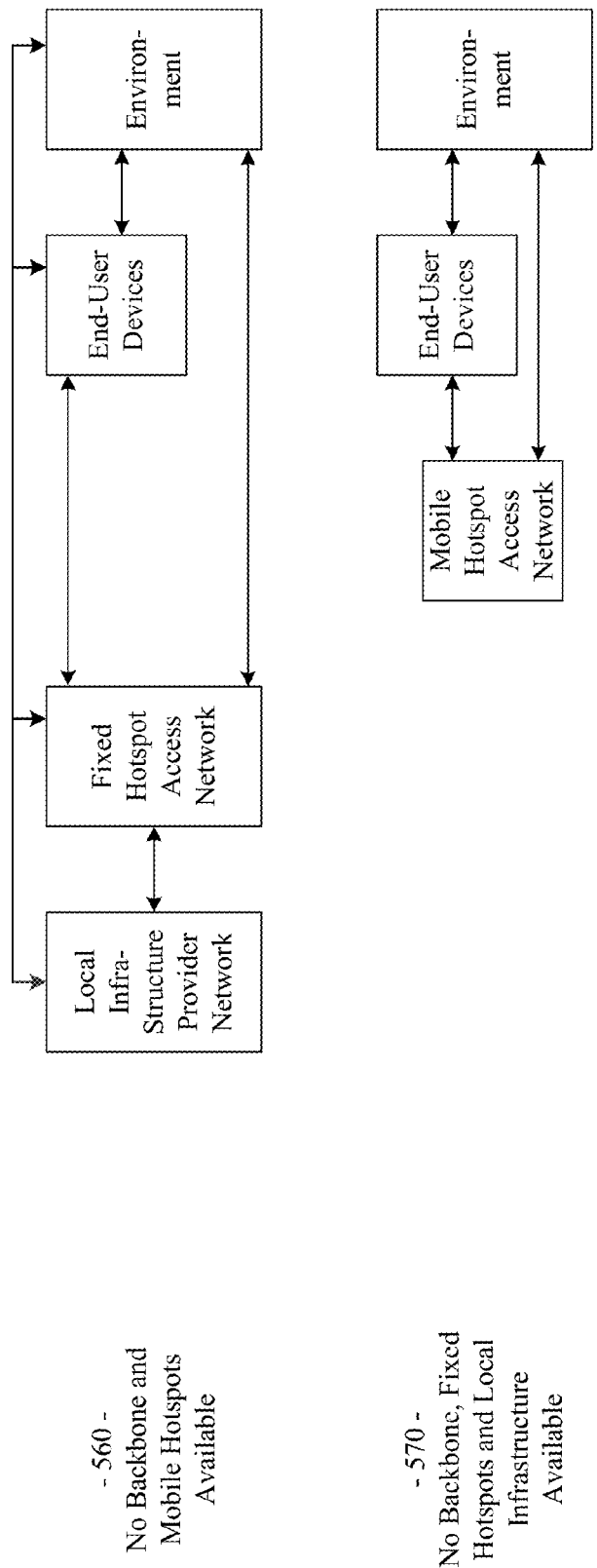

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, networks and/or network components 100, 200, 300, 400, 600, 700, 800, 900, 1000, 1100, 1200, 1300, 1400, and 1500, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
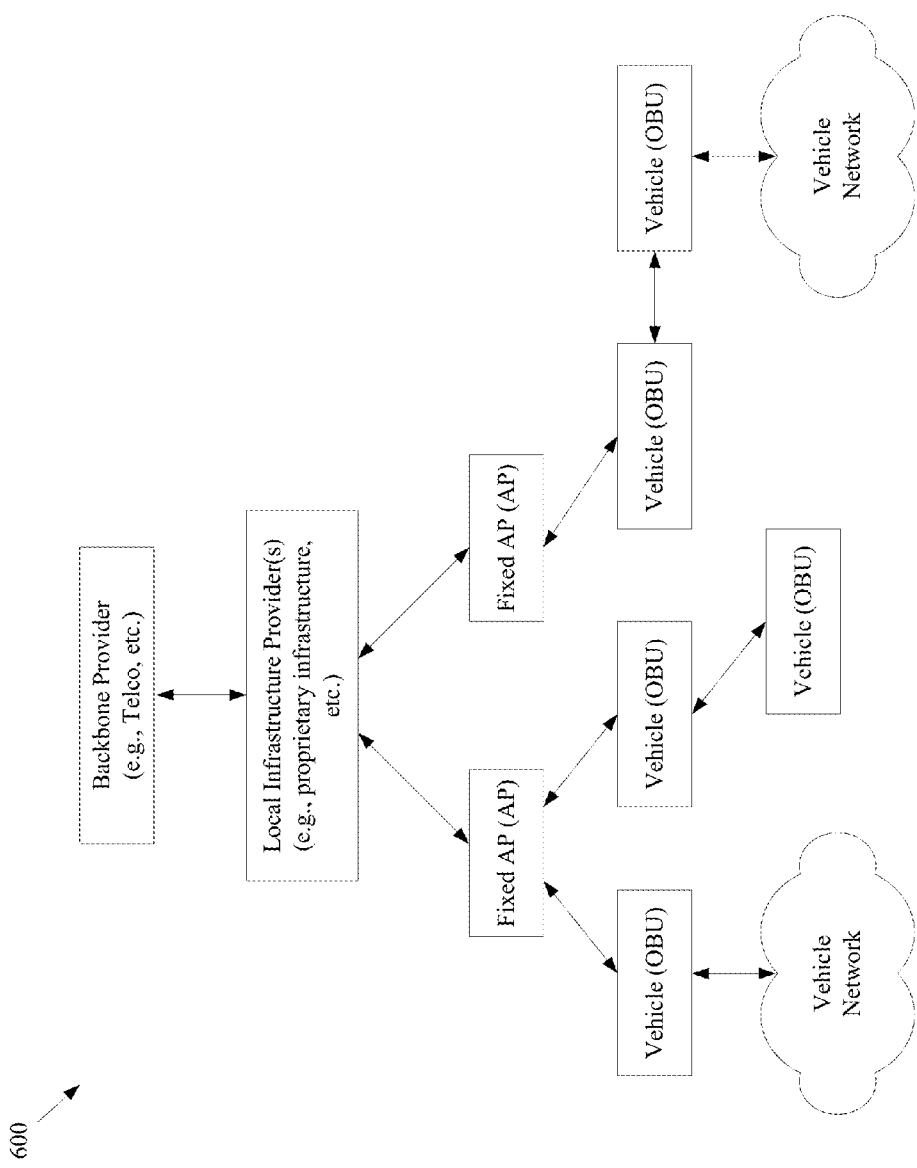
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, networks and/or network components 100, 200, 300, 400, 500-570, 700, 800, 900, 1000, 1100, 1200, 1300, 1400, and 1500, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
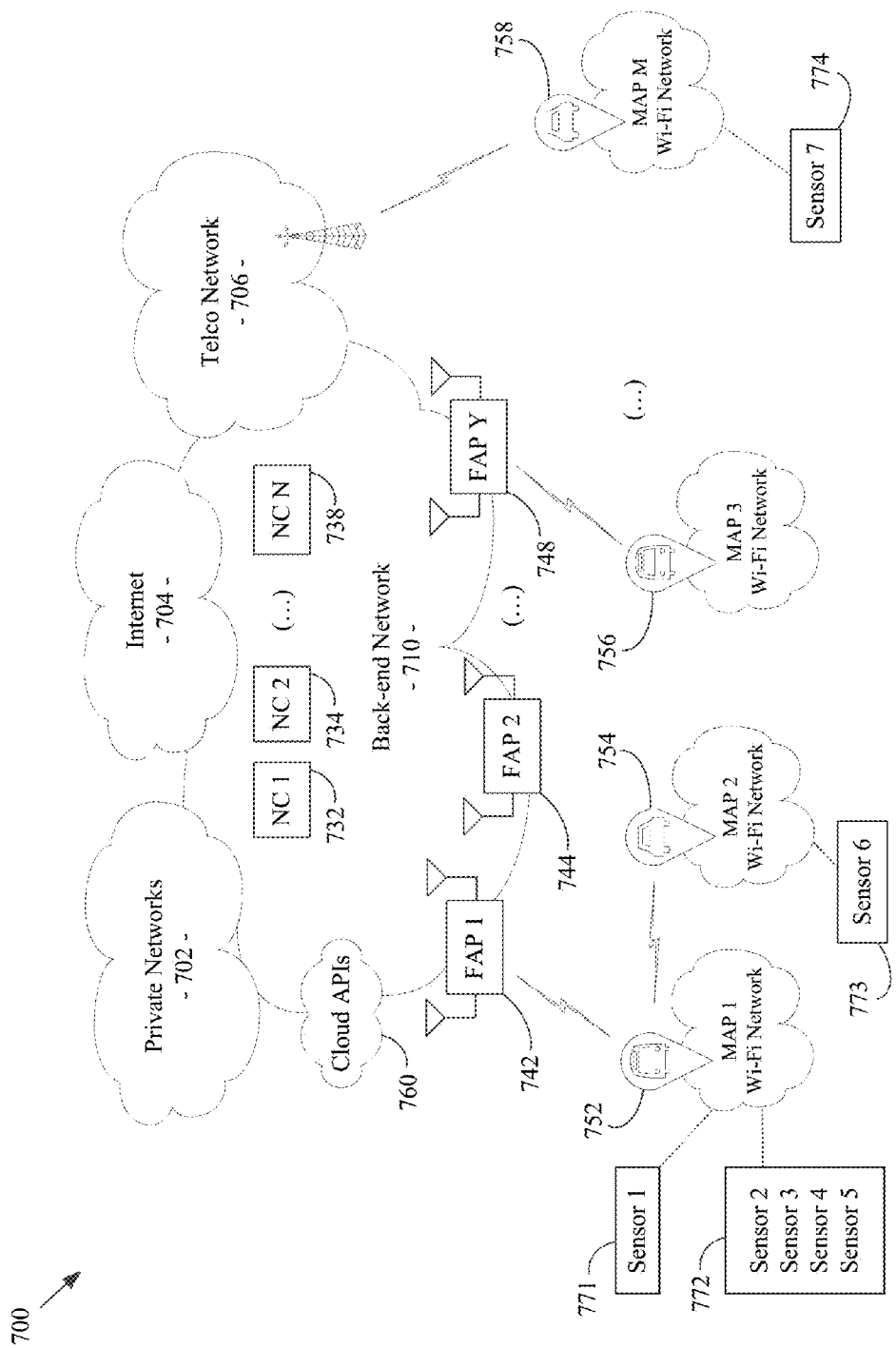
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, networks and/or network components 100, 200, 300, 400, 500-570, 600, 800, 900, 1000, 1100, 1200, 1300, 1400, and 1500, discussed herein. Notably, the example network 700 shows a plurality of vehicles (or Mobile APs, or MAPs, or OBUs) 752, 754, 756, and 758, each communicatively coupled to a Fixed AP (or RSU) 742, 744, and 748 and/or a cellular network 706, where each Mobile AP may provide network access to a vehicle network (e.g., comprising other vehicles or vehicle networks, user devices, sensor devices, etc.), for example a Wi-Fi network to which end user devices may connect, with which communication with sensors may be performed, etc. The vehicles may, for example, be autonomous vehicles, vehicles controlled by a local operator, vehicles controlled by a remote operator, etc. The example network 700 may also, for example, comprise a plurality of Network Controllers 732, 734, and 738. The example network 700 may also, for example, comprise any of a variety of interconnected networks (e.g., Private Networks 702, the Internet 704, Telecommunication Networks 706, etc.). One or more servers of the Cloud may, for example, be accessible via Cloud APIs 760.

The Mobile APs 752, 754, 756, and 758 may, for example, be communicatively coupled to various sensors (e.g., always, as the Mobile APs travel within range of such sensors, etc.). For example, in the example scenario shown in FIG. 7, a first MAP 752 is communicatively coupled to a first sensor 771 (e.g., Sensor 1) and a set of sensors 772 (e.g., Sensor 2, Sensor 3, Sensor 4, and Sensor 5), which may for example be co-located; a second MAP 754 is communicatively coupled to a sixth sensor 773; and an $M^{th}$ MAP 758 is communicatively coupled to a seventh sensor 774. The Mobile APs may, for example move in and out of communication range of the various sensors. The Mobile APs may, for example when in-range of such sensors, gather information from such sensors in a power-efficient and network-efficient manner, many examples of which are provided herein.

As discussed herein, mobile Access Points (APs) can efficiently receive and/or transmit a large variety of information, for example from sensors, from user client devices, from enterprises along a vehicle route, etc. To efficiently receive data from data sources and transport the received data to the Cloud, a communication network in accordance with various aspects of this disclosure (e.g., a network or Internet of Moving Things) may be utilized as a communication backbone. For example, in an example implementation, a vehicle equipped with a Mobile AP (or OBU) can receive data from an information source (e.g., a sensor, local area network, user client device, etc.) as the vehicle carries, passes by, or parks nearby the information source. Received data can be stored and processed and made available to/from the Cloud (e.g., via APIs or other interface) or to any node in the network. As an example, non-limiting examples of systems and methods for collecting sensor data, for example in a network of moving things, are provided in U.S. Provisional Application No. 62/222,135, titled "SYSTEMS AND METHODS FOR COLLECTING SENSOR DATA IN A NETWORK OF MOVING THINGS," filed on Sep. 22, 2015, the entire content of which is hereby incorporated herein by reference.

In accordance with various aspects of the present disclosure, systems and methods are provided that utilize one or more mobile access points to receive data (or information). Various aspects of this disclosure provide for cooperation among Mobile APs and one or more communication networks to optimize the communication of various types of data to a destination (e.g., an application executing on a computer (or server) in the Cloud, an application executing on a network node, etc.). Such data communication may, for example, be adjusted dynamically in response to various conditions (e.g., network availability, delivery time goals, network congestion, Mobile AP location and/or expected trajectory, time, day, emergency conditions, various external events, etc.). Such data communication may, for example, comprise transporting the data to the Cloud or any other node in various ways (e.g., utilizing any of a variety of communication technologies, utilizing any of a variety of pathways through the network, utilizing delay-tolerant networking (DTN), utilizing opportunistic uploads, for example via Wi-Fi networks accessible to a Mobile AP (e.g., while moving, while stationary, etc.), utilizing cellular network communication if necessary or desired, etc.).

In a network in which mobile nodes (e.g., Mobile APs, user devices, etc.) are utilized to receive (or collect or gather) data, sources of such data may be numerous and the volume of such data may be great. Over time, it is expected that the network of moving things will result in a rapid increase in the amount of data received and/or communicated (e.g., in a metropolitan area, etc.). Such increases in the volume of data, however, present data collecting, storage, processing, and communication challenges.

In an example scenario in which there is too much data for one or more Mobile APs to handle, some data may be lost (e.g., not collected at all, only partially collected, collected with errors, etc.). Other data may be collected, but not in a timely manner. For example, a Mobile AP may fail or be overwhelmed if operated autonomously in accordance with an inflexible data collection strategy (or plan). Fortunately, a network of moving things provides the flexibility and/or adaptability needed to respond to unforeseen system disturbances, data collecting and/or communicating needs, system and/or sensor topology changes, etc. Such flexibility may, for example, provide for the necessary or desired amount of data to be received and/or communicated to a destination.

A communication network, or portion thereof, constructed and/or operated in accordance with various aspects of the present disclosure provides many benefits, non-limiting examples of which include the utilization (or exploitation) of opportunistic communication. For example, for various types of data (e.g., data associated with no real-time delivery urgency, etc.) may be communicated utilizing networks encountered during a Mobile AP's travels (e.g., a Wi-Fi network available to the Mobile AP as the Mobile AP drives through and/or or parks in the coverage area of the Wi-Fi network, etc.). Note that such communication may occur in both upstream and downstream directions.

Also for example, a Mobile AP may receive information to communicate upstream, but might not presently be in communication range of a Fixed AP of the vehicle network. In such a scenario, for example in which the data need not be communicated upstream immediately, the Mobile AP may store the received data and wait to be within range of a Fixed AP, for example instead of utilizing the cellular network. Additionally, as discussed herein, the Mobile AP may communicate the received data to other Mobile APs for their assistance with the communication of such data.

Such opportunistic communication may reduce data communication costs, for example utilizing free (or cheap) access to Wi-Fi networks rather than consuming communication bandwidth of the vehicle communication network in which Mobile APs typically operate and/or rather than paying the costs associated with the communication of data over the cellular communication network. Additionally, such opportunistic communication may reduce bandwidth consumption of cellular networks, which is limited and shared among several devices.

A system and/or method implemented in accordance with various aspects of this disclosure may, for example, incorporate store-and-forward mechanisms (or techniques) to assist with the opportunistic communication of data. For example, data may be replicated to perform upstream and/or downstream communication of data within the network. Though as discussed herein, cellular network utilization tends to be expensive, various aspects of this disclosure still comprise the flexible utilization of cellular network communication when necessary or desired.

Figure 8:
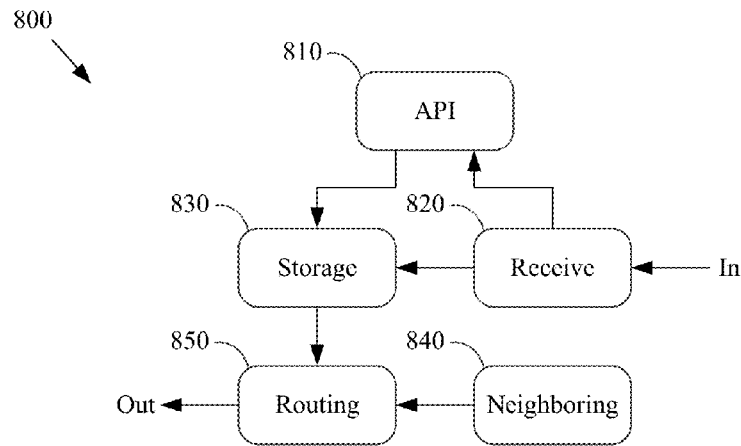
FIG. 8 shows a block diagram of a system and method at a node for delay tolerant networking, in accordance with various aspects of the present disclosure.

Turning to FIG. 8, such figure shows a block diagram of a system 800 and method at a node for delay tolerant networking, in accordance with various aspects of the present disclosure. The example system 800 may, for example, share any or all characteristics with the other example methods, networks and/or network components 100, 200, 300, 400, 500-570, 600, 700, 900, 1000, 1100, 1200, 1300, 1400, and 1500, discussed herein. Any or all of the aspects of FIG. 8 (e.g., any or all of the blocks and/or portions thereof) may be implemented in a node of a communication network (e.g., a Mobile AP or OBU, etc.). For example, the system 800 may be implemented in a Mobile AP or other network node.

The example system 800 may, for example, comprise an Application Program Interface (API) 810 via which the system 800 (e.g., a node or portion thereof) may send and/or receive data to and/or from the delay tolerant network (DTN). For example, applications executing on a node may utilize the API 810 to perform reception and/or transmission of data packets.

For example, in an example implementation, an application that desires to send data may provide a destination and a service identifier to the API. Also for example, an application that desires to receive data may, for example, just register a service identifier. Note that such application may also, in various scenarios, specify source identity information.

The example system 800 (e.g., a Mobile AP, etc.) may, for example, comprise a Receive block 820 (or module) that is operable to receive packets transmitted by other nodes within range of the node (e.g., peer nodes, Mobile AP nodes, Fixed AP nodes, sensor nodes, user client nodes, Network Controller nodes, network infrastructure nodes, cellular nodes, network access points, etc.).

The example system 800 may, for example, comprise a Storage block 830 (or module). The Storage block 830 may, for example, implement permanent and/or temporary caching of received data. For example, in a scenario in which received data is to be forwarded (e.g., upstream, downstream, etc., including to peer nodes), the Storage block 830 may manage the memory utilized for such caching (e.g., memory allocation, writing, reading, memory deallocation, etc.). For example, the Storage block 830 may be operable to store data until the data is successfully communicated to its destination, until the data is successfully communicated to all desired destinations, until the data expires, etc.).

The example system 800 may, for example, comprise a Neighboring (or Neighboring Node) block 840 (or module) that is operable to maintain an updated list of neighbor nodes in the area of the system 800. For example, in an example implementation in which the system 800 is implemented in a Mobile AP, the Neighboring block 840 may operate to maintain a list of nodes (e.g., Mobile AP nodes, Fixed AP nodes, sensor nodes, Wi-Fi access point nodes, cellular base station nodes, user client nodes, etc.) that are believed to be in communication range of the Mobile AP.

The example system 800 may, for example, comprise a Routing block 850 (or module) that is operable to perform any or all of the communication routing discussed herein (e.g., the routing of data to peer nodes (e.g., peer Mobile AP nodes, etc.), the routing of information to vehicle communication network infrastructure components (e.g., Fixed AP nodes of the vehicle or mobile network, etc.), opportunistic routing of information to Wi-Fi networks, routing of information to a cellular network, etc.

In an example implementation, the Routing block 850 may operate to consider available neighbor nodes (e.g., of a list maintained by the Neighboring block 840, etc.), the stored data and its destination, a number of replications desired and/or allowed, time, signal strength, estimated travel routes of other nodes, network connectivity of other nodes, fleet associations of other nodes, bandwidth utilization of other nodes, etc., when determining other nodes to which the data is to be transmitted. Note that such routing determinations may be different when communicating (or uploading) data to the Cloud (e.g., to a Cloud server or database) versus disseminating (or downloading) data to another node, or any or all nodes, throughout the network.

In accordance with various aspects of the present disclosure, data (e.g., a data packet, file, etc.) may be associated with a lifetime. In such an example implementation, when data has reached its lifetime, the data may be dropped and/or sent through a cellular network. In an example implementation, each data packet (or record, or file, etc.) may be assigned a lifetime, a delivery deadline, a priority ranking, an indication of whether cellular network utilization is authorized for fault-back (or fail-safe) communication, etc.

Figure 9:
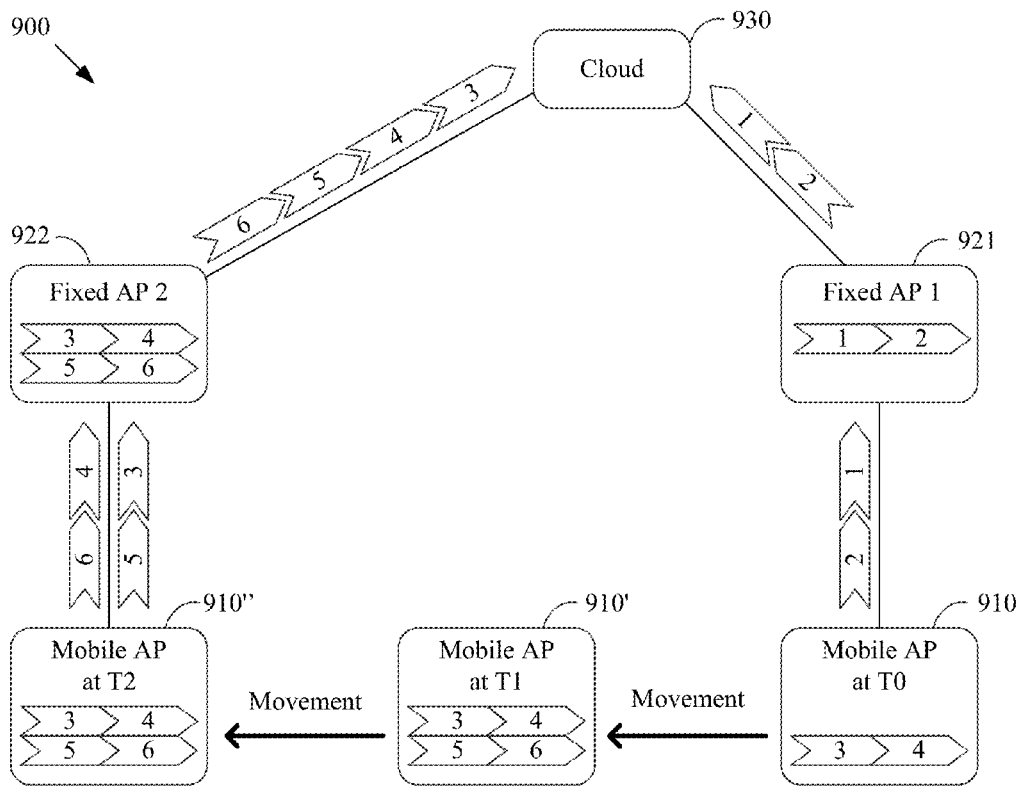
FIG. 9 shows a block diagram of a system and method in a mobile network for delay tolerant networking, in accordance with various aspects of the present disclosure.

FIG. 9 shows a block diagram of a system and method in a mobile network for delay tolerant networking, in accordance with various aspects of the present disclosure. The example system (or network) of FIG. 9 may, for example, share any or all characteristics with the other example methods, networks and/or network components 100, 200, 300, 400, 500-570, 600, 700, 800, 1000, 1100, 1200, 1300, 1400, and 1500, discussed herein. The illustration 900 of FIG. 9 shows an example manner in which a Mobile AP may communicate (e.g., upload) data to the Cloud (e.g., to a server, an application being executed by a server, etc.).

The example illustration 900 shows three distinct moments in time, in particular: T0, T1 and T2. At time T0, the Mobile AP 910 has four packets stored, but is only able to send two packets (e.g., packet 1 and packet 2) through a first Fixed AP 921 of the system (or network). The first Fixed AP 921, in turn, communicates the first two packets (e.g., packet 1 and packet 2) to the Cloud 930 (e.g., a Cloud server, database, central controller, etc.). The Mobile AP 910 removes the first two packets from memory and continues to store the other two packets (e.g., packet 3 and packet 4). In an example scenario, the Mobile AP 910 may for example receive an ACK from the Cloud (e.g., via the first Fixed AP 921, etc.) indicating that the first two packets were successfully received by the ultimate destination, at which point the Mobile AP 910 may remove the first two packets from memory. In another example scenario, the Mobile AP 910 may assume that since the first two packets were delivered successfully to the first Fixed AP 921, the packets will be delivered to their ultimate destination successfully, and then remove the first two packets from memory.

At time T1, the Mobile AP 910' still has packet 3 and packet 4 stored, but has also received (or generated) two more packets to communicate (e.g., packet 5 and packet 6). At time T1, the Mobile AP 910' is unable to communicate any of the stored packets to the network, so continues to store such packets.

At time T2, the Mobile AP 910" is in range of the second Fixed AP 922 and sends all of the stored packets (e.g., packet 3, packet 4, packet 5, and packet 6) to the Cloud 930 via the second Fixed AP 922.

Figure 10:
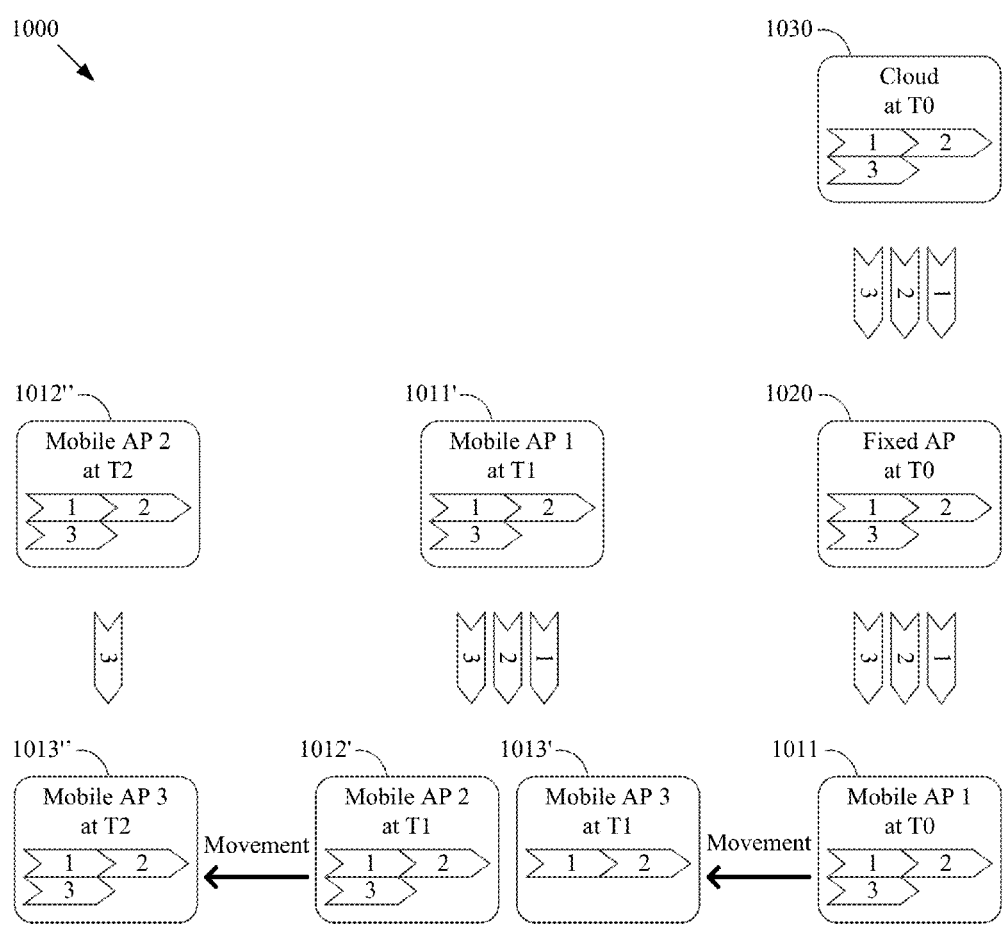
FIG. 10 shows a block diagram of a system and method in a mobile network for delay tolerant networking, in accordance with various aspects of the present disclosure.

FIG. 10 shows a block diagram of a system and method in a mobile network for delay tolerant networking, in accordance with various aspects of the present disclosure. The example system 1000 may, for example, share any or all characteristics with the other example methods, networks and/or network components 100, 200, 300, 400, 500-570, 600, 700, 800, 900, 1100, 1200, 1300, 1400, and 1500, discussed herein. The illustration 1000 of FIG. 10 shows an example manner in which a Mobile AP may disseminate (e.g., or download or laterally propagate) data from the Cloud (e.g., to other Mobile APs, etc.).

The example illustration 1000 shows three distinct moments in time, in particular: T0, T1 and T2. At time T0, the first Mobile AP 1011 receives three packets (e.g., packet 1, packet 2, and packet 3) from the Cloud 1030 via the Fixed AP 1020, for example when the first Mobile AP 1011 travels within range of the Fixed AP 1020. The first Mobile AP 1011 then stores the received three packets until such packets can be communicated to the other Mobile APs (e.g., the second Mobile AP 1012 and the third Mobile AP 1013), for example when such other Mobile APs are within communication range of the first Mobile AP 1011'.

At time (or time window) T1, the first Mobile AP 1011' (e.g., through the first Mobile AP 1011 moving and/or the second Mobile AP 1012 and third Mobile AP 1013 moving) comes within range of the second Mobile AP 1012' and the third Mobile AP 1013', which are destinations for the data. The first Mobile AP 1011' successfully communicates the three packets to the second Mobile AP 1012', but only successfully communicates the first and second packets to the third Mobile AP 1013'. For example, the first Mobile AP 1011' and the third Mobile AP 1013' might not have been in communication range long enough to successfully communicate all three packets.

At time T2, the third Mobile AP 1013" is now within communication range of the second Mobile AP 1012". For example, the third Mobile AP 1013" may determine that it is within range of the second Mobile AP 1012" by analyzing a signal transmitted by the third Mobile AP 1013", by analyzing vehicle location information (e.g., as received from a positioning system, from an autonomous vehicle control system, etc.). The second Mobile AP 1012" completes the communication of the three packets to the third Mobile AP 1013" by communicating the third packet to the third Mobile AP 1013". At this point, all three of the example Mobile APs have successfully received the three packets from the Cloud 1030. In an example implementation, the Mobile APs may communicate with each other to determine the present state of the packet transfer. For example, Mobile APs that encounter each other may discuss whether each of such Mobile APs has fully received particular data.

Note that the Mobile APs may also indicate information characterizing the data being propagated. For example, such data may have a version number, publishing date, etc. In such a scenario, Mobile APs may work together to ensure that they each have the latest updates to information.

Figure 11:
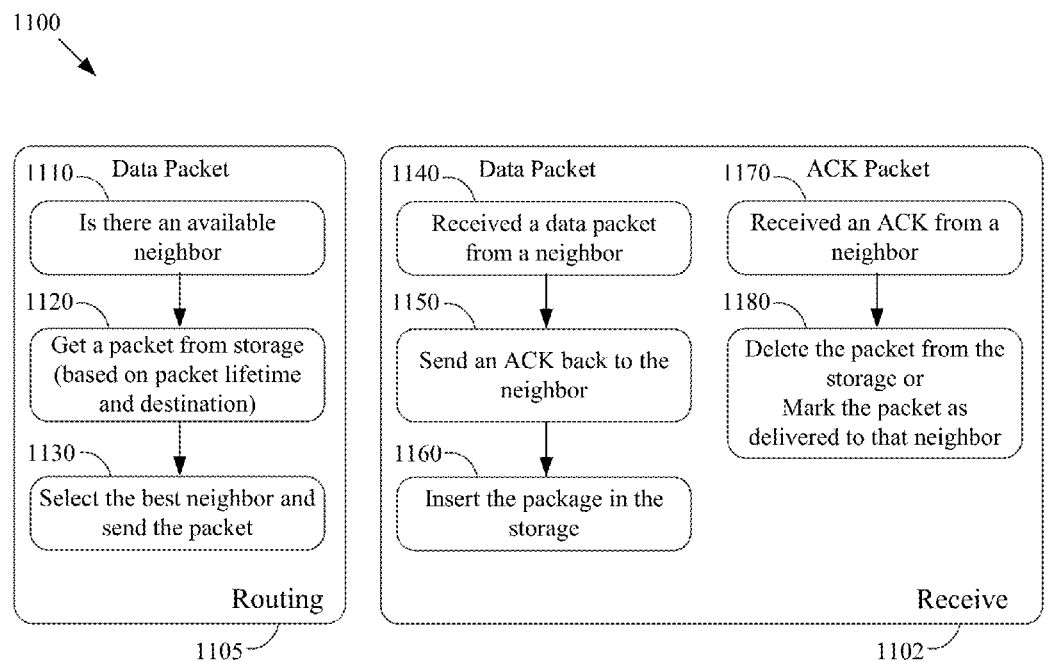
FIG. 11 shows a block diagram of a system and method at a node for delay tolerant networking, in accordance with various aspects of the present disclosure.

FIG. 11 shows a block diagram of a system and method at a node for delay tolerant networking, in accordance with various aspects of the present disclosure. The example system and method 1100 may, for example, share any or all characteristics with the other example methods, networks and/or network components 100, 200, 300, 400, 500-570, 600, 700, 800, 900, 1000, 1200, 1300, 1400, and 1500, discussed herein. FIG. 11 may, for example, show various processes that may be implemented by the Routing block and the Receive block discussed herein.

The example system and method 1100 may, for example, comprise a Receive block 1102. The Receive block 1102 may comprise any of a variety of characteristics, non-limiting examples of which are provided herein.

In an example implementation, the Receive block 1102 may comprise the capability to distinguish a received data packet from an acknowledgment (ACK) packet. If the received packet is a data packet (e.g., as determined at block 1140), the node may store the packet in memory (e.g., at block 1160), for example after verifying that the data packet is not already stored in memory. The Receive block 1102 may also (e.g., at block 1150) communicate an ACK packet at to the node that sent the data packet (e.g., a peer node, an original source node, etc.), confirming that the data packet was successfully received. If, however, the received packet is an ACK packet from a neighbor (e.g., as determined at block 1170), the node may (e.g., at block 1180) mark the stored data packet to which the ACK corresponds as delivered to that neighbor (e.g., in a case in which the data is being disseminated in the network, distributed to particular other nodes, etc.). Also for example, the node may delete the data packet (e.g., at block 1180) to which the ACK corresponds from storage (e.g., when the node determines that its distribution of the data packet has been completed).

Note that the ACK or related information may be disseminated in the network in an example scenario in which the ACK is originated by the ultimate destination for the data (e.g., an application executing on a server in the Cloud, etc.). For example, in an example scenario in which a Mobile AP has propagated data to other Mobile APs in an attempt to communicate the data to a Cloud destination, receipt of an ACK that originated from the Cloud destination may cause dissemination of the ACK to the other Mobile APs that received the propagated data. Such communication may, for example, reduce the amount of redundant communication of the propagated data. In another example scenario, for example in which a Mobile AP successfully delivers the data to a Fixed AP and receives the ACK from the Fixed AP, the Mobile AP may assume that subsequent delivery of the data is guaranteed and thus purge the data from its storage. In an example scenario, the network may flood the network (or a portion thereof, for example under one or more particular Fixed APs) with such ACK. In another example scenario, the network may propagate the ACK in the same manner as the network disseminates data packets, as discussed herein.

The example system and method 1100 may also, for example, comprise a Routing block 1105. The Routing block 1105 may comprise any of a variety of characteristics, non-limiting examples of which are provided herein.

The Routing block 1105 may, for example, determine the node(s) to which the received data will be sent. To make this determination (e.g., at block 1110), the Routing block 1105 may consider many factors, for example whether a network access point (e.g., a Wi-Fi hot spot AP, vehicle communication network Fixed AP, other Mobile APs, etc.) is in communication range, the delivery requirements (e.g., time constraints, priority, guaranteed/not, etc.) associated with the data, the lifetime of the data, etc. In an example scenario, the Routing block 1105 may retrieve the data from storage (e.g., at block 1120) if necessary, and send the data (e.g., at block 1130). In an example implementation, the Routing block 1105 may (e.g., at block 1130) send the data to a Wi-Fi hot spot AP if available, else send the data to a Fixed AP of the vehicle communication network if available, else send the data to one or more other Mobile APs if available, and may ultimately send the data to a destination utilizing a cellular link if time and/or priority constraints warrant such action. In a scenario in which the Routing block 1105 decides to send the data to one or more other Mobile APs, the Routing block 1105 may identify (e.g., at block 1130) the best Mobile AP (or N best Mobile APs) to which the Routing block 1105 should send the data.

Figure 12:
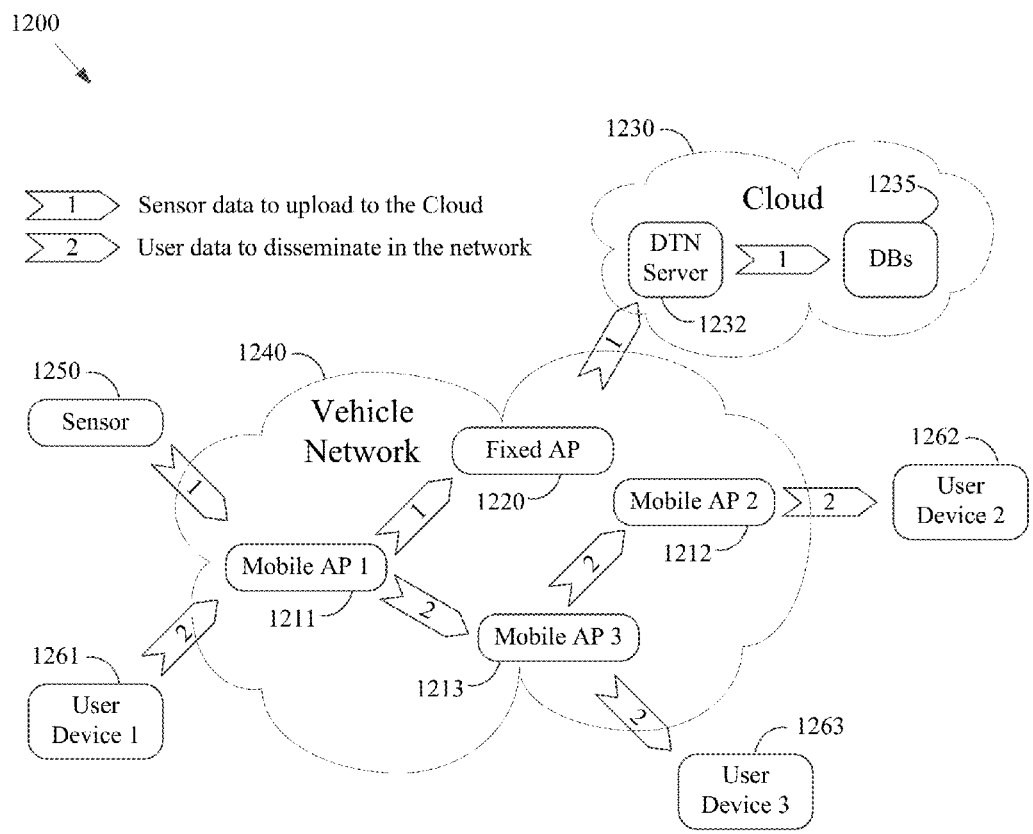
FIG. 12 shows a block diagram of a system and method in a mobile network for delay tolerant networking, in accordance with various aspects of the present disclosure.

FIG. 12 shows a block diagram of a system and method in a mobile network for delay tolerant networking, in accordance with various aspects of the present disclosure. The example system 1200 may, for example, share any or all characteristics with the other example methods, networks and/or network components 100, 200, 300, 400, 500-570, 600, 700, 800, 900, 1000, 1100, 1300, 1400, and 1500, discussed herein.

For example, as discussed herein, the respective functionalities of the blocks presented herein may be implemented in any node of the network. Accordingly, the capability is provided to have an end-to-end DTN between any two nodes in the network, for example between two user client devices, between a sensor and a Cloud server, between any two communication network nodes, etc. In an example implementation, the end-to-end DTN functionality is accomplished by incorporating all of the DTN functionality into each node, even for example end user client or sensor nodes. In another example implementation, the end-to-end DTN functionality is generally accomplished by incorporating all (or most all) of the DTN functionality into each node of the vehicle network, providing a convenient interface to end devices (e.g., sensor devices, user client devices, etc.) desiring to utilize the DTN capabilities of the network.

The example method, system, and/or network 1200 may, for example, be implemented as a dynamic mesh network (e.g., at least at the Mobile AP level) that comprises multi-hop capability and multi-homing (or location) capability in the vehicle (or mobile) network (e.g., in Mobile APs, in Fixed APs, etc.). User devices and/or sensors may, for example, communicate with the vehicle (or mobile) network via Wi-Fi or other WLAN or WPAN connections. In an example implementation, each device may be associated with an identification within the network. Routing functionality may generally, for example, be implemented by nodes of the vehicle (or mobile) network (e.g., by the Mobile APs and/or Fixed APs) to update data to the Cloud or to disseminate data throughout the vehicle (or mobile) network. For example, the source and destination endpoints may simply communicate the information to a node of the vehicle (or network) network and then rely on the network to perform the communication.

In an example delay tolerant networking implementation, the DTN functionality may, for example, be performed at a layer above the OSI layer 2 (MAC layer), for example inside the vehicular network through DSRC. For example, the DTN protocol (or portions thereof) may be implemented at the Operating System (OS) level. Various aspects of the DTN protocol may also be implemented at the OSI layer 4 (Transport layer), for example to exchange data with DTN servers and to be able to use all available interfaces of different communication technologies.

In an example implementation, DTN servers may be implemented in the Cloud to absorb DTN traffic peaks. For example, such DTN servers may understand the DTN protocol and may thus be able to translate to other protocols to store data in the Cloud databases (DBs).

In the example 1200 shown in FIG. 12, a sensor 1250 having sensor data to upload to the Cloud communicates such sensor data to the first Mobile AP 1211 of the vehicle network 1240, which communicates such sensor data to a Fixed AP 1220 of the vehicle network 1240, which communicates such sensor data to a DTN server 1232 of the Cloud 1230, which communicates such sensor data to a database 1235 of the Cloud 1230.

Also in the example 1200 shown in FIG. 12, a first user device 1261 having user data to disseminate in the network communicates such user data to the first Mobile AP 1211 of the vehicle network 1240, which communicates such user data to a third Mobile AP 1213 of the vehicle network 1240, which communicates such user data to a second Mobile AP 1212 of the vehicle network 1240. The third Mobile AP 1213 communicates such sensor data to a third user device 1263, and the second Mobile AP 1212 communicates such sensor data to a second user device 1262.

Figure 13:
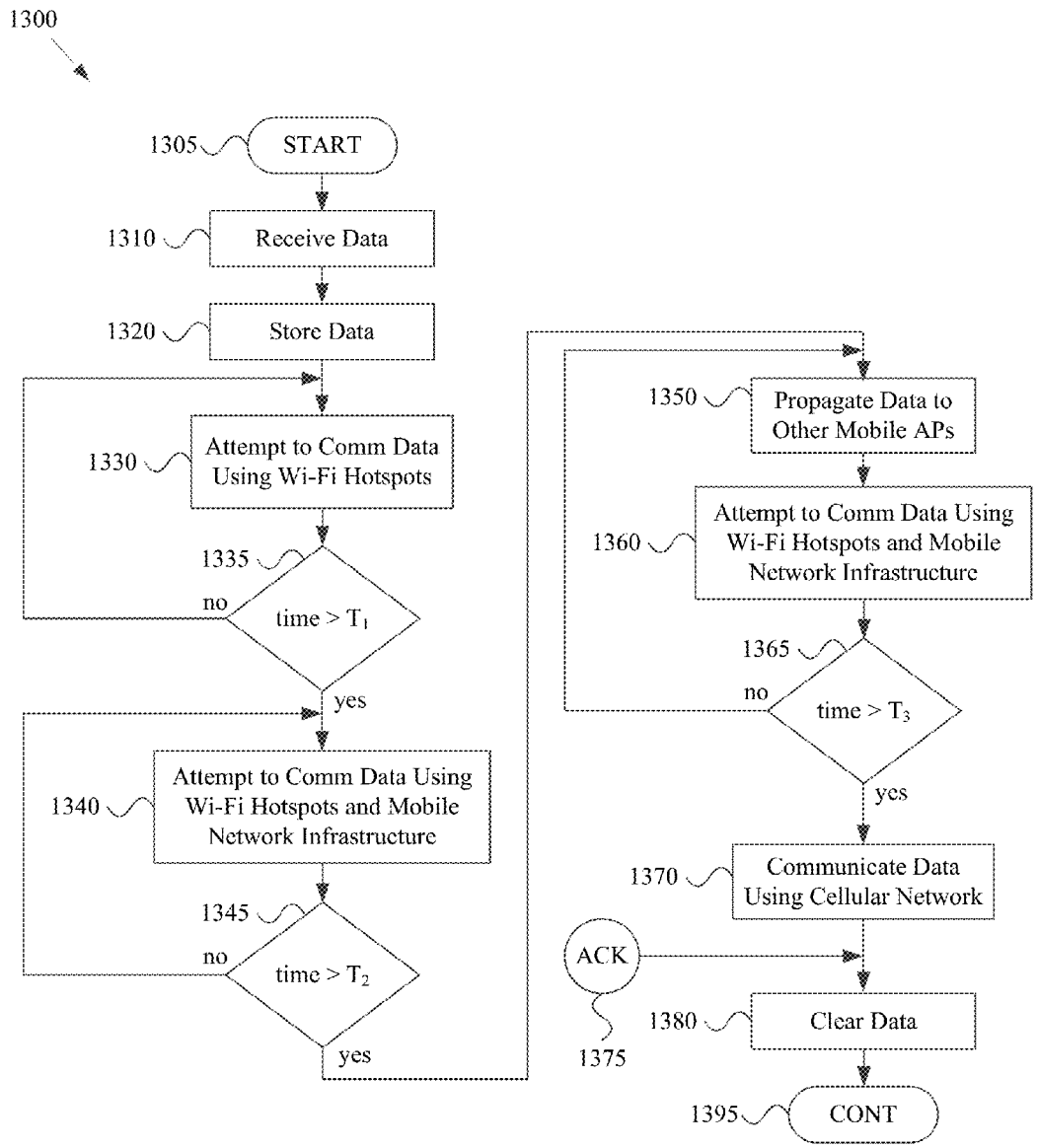
FIG. 13 shows a block diagram of a method in a node for delay tolerant networking, in accordance with various aspects of the present disclosure.

FIG. 13 shows a block diagram of a method 1300 for performing delay tolerant networking, for example in a node, in accordance with various aspects of the present disclosure. The example method 1300 and system may, for example, share any or all characteristics with the other example methods, networks and/or network components 100, 200, 300, 400, 500-570, 600, 700, 800, 900, 1000, 1100, 1200, 1400, and 1500, discussed herein. The example method 1300 or any portion thereof may, for example, be implemented in any network node discussed herein (e.g., a Mobile AP or OBU, etc.). The example method 1300 may also incorporate any or all of the functionality discussed herein.

The example method 1300 may begin executing at block 1305. At block 1310, data to be propagated upstream to the Cloud (e.g., to an application running on a computer or server in the Cloud) is received. The received data is stored at block 1320.

In the example implementation, it is determined that for at least a time $T_1$, the preferred form of communication for the data will be through opportunistic utilization of a Wi-Fi network. For example, a Mobile AP implementing the method 1300 may store the data, continually looking for an accessible Wi-Fi network (e.g., a publicly available Wi-Fi hot spot, etc.) via which the Mobile AP may communicate the data to or toward its ultimate destination.

Although not specifically shown in the method 1300, different levels of secure communication may be utilized for communicating the data based on the communication pathway utilized. For example, communication of sensitive data via the public Internet may be performed utilizing a higher degree of data protection (e.g., encryption, etc.), while data communicated via a closed vehicle network may be communicated with a lower degree of data protection.

If the time threshold $T_1$ is exceeded and the data has not yet been successfully communicated, then the method 1300, at block 1340, adds a second network communication possibility, in particular the vehicle (or mobile) network infrastructure (e.g., Fixed APs, etc.). Accordingly, until time $T_2$ is exceeded, the node will utilize a Wi-Fi hotspot or the vehicle network to communicate the data, whichever is available first. For example, if a Mobile AP detects a Wi-Fi hotspot through which the Mobile AP may communicate the data to its destination, then the Mobile AP will attempt to communicate the data in such manner. Also for example, if a Mobile AP detects a Fixed AP of the vehicle network, then the Mobile AP will attempt to communicate the data in such manner.

If the time threshold $T_2$ is exceeded and the data has not yet been successfully communicated, then the example method 1300, at block 1350, propagates the data to other Mobile APs, for example to increase the odds that some carrier of the data will encounter a network (e.g., a Wi-Fi hotspot, a vehicle network Fixed AP, etc.) over which the data can be communicated. Block 1350 may comprise performing such propagation in any of a variety of manners. For example, block 1350 may comprise determining how many Mobile APs and/or which APs to send the data. There may, for example, be a target (or maximum) number of Mobile APs based on hop count. For example, in a scenario in which a Mobile AP was a single-hop recipient of the data, the Mobile AP may communicate the data to N (e.g., 3 or 4, etc.) other Mobile APs. Also for example, in a scenario in which a Mobile AP was a second-hop recipient of the data (e.g., receiving the data from another Mobile AP), the Mobile AP may communicate the data to M (e.g., 1 or 2) other Mobile APs. Additionally for example, in a scenario in which a Mobile AP was a third-hop recipient of the data, the Mobile AP might determine that it is not allowed by the propagation protocol to further propagate the data.

In an example scenario in which a Mobile AP may communicate the data to four other Mobile APs, the Mobile AP may select the first four other Mobile APs with the strongest signal strength. Also for example, the Mobile AP may select another Mobile AP that is known to be in a coverage area of an available Wi-Fi hotspot and/or a Fixed AP of the vehicle network. Additionally for example, the Mobile AP may select another Mobile AP that has a location and a trajectory that will soon lead such Mobile AP into a coverage area of a Fixed AP of the vehicle network.

Until the time threshold $T_3$ is exceeded and if the data has not yet been successfully communicated, then the method 1300, at block 1360, continues to attempt to utilize a Wi-Fi hotspot or the vehicle network to communicate the data, whichever is available first. Note that in this case, a plurality of other Mobile APs may similarly be attempting to communicate the same data to the same ultimate destination. For example, if any of the Mobile APs detects a Wi-Fi hotspot through which the Mobile AP may communicate the data to its destination, then the Mobile AP will attempt to communicate the data in such manner. Also for example, if any of the Mobile APs detects a Fixed AP of the vehicle network, then the Mobile AP will attempt to communicate the data in such manner.

If the time threshold $T_3$ is exceeded and the data has not yet been successfully communicated (at least as far as is known by the node implementing the method 1300), then the method 1300, at block 1370, communicates the data utilizing the cellular network. In this case, the cellular network is utilized as a safety net (or fault-over) for communication of the data (albeit an expensive alternative generally). Though not shown, a determination may be made to drop the data and not communicate the data. For example, if it is determined that the data is not important enough to warrant utilization of the cellular network, the decision may be made to clear the data from memory and refrain from further attempting to communicate it. For example, particular data may be classified as loss-tolerant, and may also be flagged to utilize only low-cost communication pathways for the communication of such data, for example deleting the data if such low-cost communication is not available. In an example implementation, when data is received by a Mobile AP, information received with the data may indicate that the data may only be communicated via a Wi-Fi hot spot and the vehicle network, and that the data has a lifetime of three hours after which it should be dropped, even if not further communicated.

At block 1380, the example method 1300 may comprise clearing (or removing) the data from memory. For example, block 1380 may comprise de-allocating memory in which the data was stored and/or removing a reference to the data from a list of data to communicate. Note that each node may comprise a list of data to communicate, and such list may be prioritized (e.g., based on type of data, based on data delivery deadlines, based on data lifetime, based on client or customer priority, etc.).

As discussed herein, various decisions (e.g., routing decisions, storage decisions, propagating decisions, etc.) may be made based on various parameters or factors (e.g., time constraints, data priority or importance, number of other Mobile APs to utilize, identify of networks to utilize, etc.). Such parameters may be communicated to the node in any of a variety of manners. For example, the original data communicated to the node may include information (e.g., in packet fields, header fields, meta data, etc.) identifying the parameters for the data. For example, a data packet communicating the data or a portion thereof may indicate a maximum allowable guaranteed delivery time, at which point the cellular network must be utilized. Also for example, such a data packet may indicate how many Mobile APs may receive replicates of the data. Additionally for example, such a data packet may indicate a maximum lifetime, after which the data should be dropped. Such information may also for example be programmed into applications, specified in a configuration file, etc.

Also as discussed herein, an ACK packet may be communicated from an immediate recipient of the data and also from the final destination recipient of the data. In a scenario in which an ACK packet or other information indicates to the node that the data has been received at the destination (or at a node that is reliable enough to consider such delivery to be final), the node may cease attempts to communicate the data and remove the data from memory. An example of such operation is shown at block 1375, at which an incoming ACK directs execution flow of the example method 1300 to block 1380 at which the data is cleared from storage. This may, for example, be particularly useful in a scenario in which at block 1350 the data was propagated to other Mobile APs, each independently attempting to communicate the data to the destination. In such a scenario, the ACK may be propagated by the network infrastructure but may also be propagated by the Mobile APs to each other.

Note that the example method 1300 is merely presented to illustrate various aspects of the present disclosure and is non-limiting. For example, additional functionality may be performed, for example as discussed throughout this disclosure. Also for example, any of the functionality of the example method 1300 may be removed. For example, utilization of Wi-Fi hotspots may be optional, propagation of data to other Mobile APs may be immediate and non-discretionary, for high-priority data utilizing the cellular network may be immediate, etc. Further for example, any of the functionality may be repeated. For example, the number of Mobile APs to which data is propagated may be increased after a particular amount of time has passed. Accordingly, the scope of this disclosure should not be limited by particular characteristics of the example method 1300 or by any example discussed herein.

Figure 14:
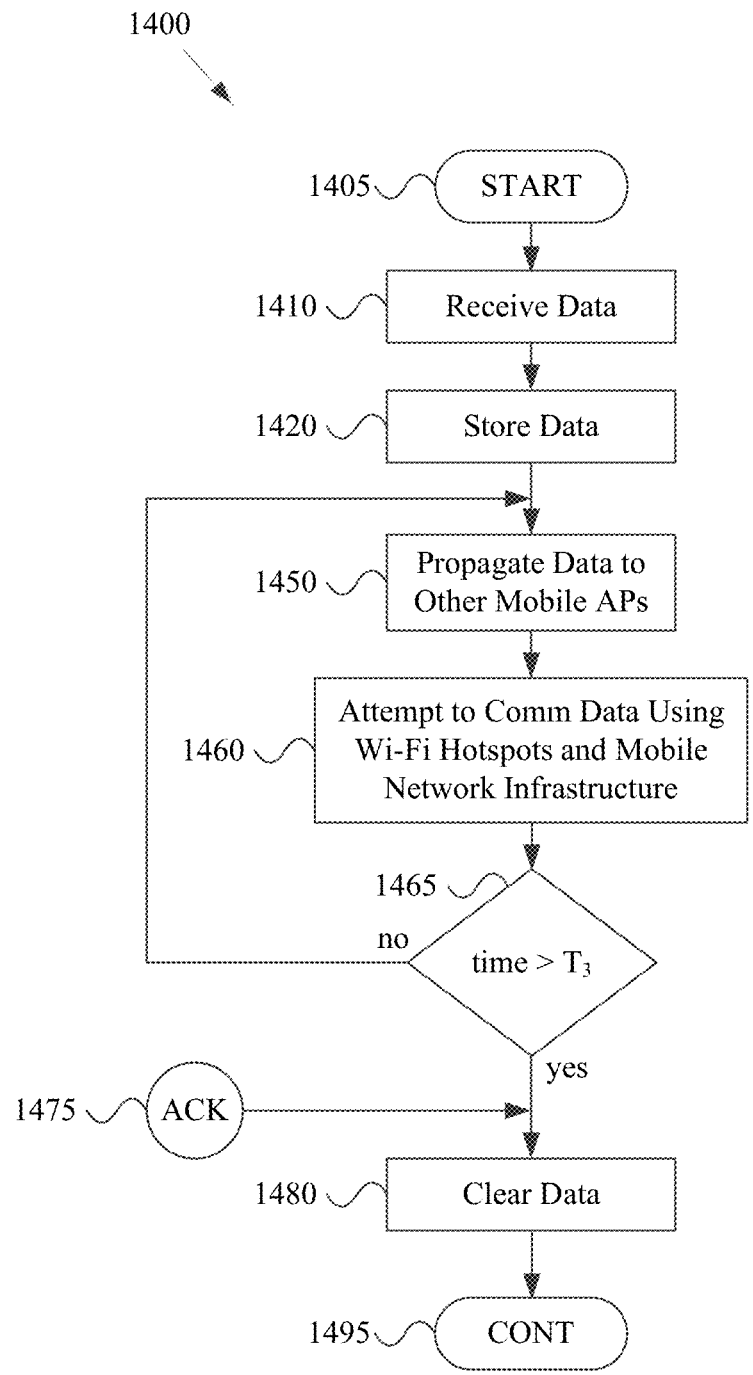
FIG. 14 shows a block diagram of a method in a node for delay tolerant networking, in accordance with various aspects of the present disclosure.

As discussed with reference to block 1350, data may be communicated to other Mobile APs (or other nodes), which may then also attempt to communicate the data. An example method for the operation of such other nodes is provided at FIG. 14, which shows a block diagram of a method 1400 in a node for delay tolerant networking, in accordance with various aspects of the present disclosure. The example method 1400 and system may, for example, share any or all characteristics with the other example methods, networks and/or network components 100, 200, 300, 400, 500-570, 600, 700, 800, 900, 1000, 1100, 1200, 1300, and 1500, discussed herein. The example method 1400 or any portion thereof may, for example, be implemented in any network node discussed herein (e.g., a Mobile AP or OBU, etc.). The example method 1400 may also incorporate any or all of the functionality discussed herein.

The example method 1400 may begin executing at block 1405. At block 1410, data to be propagated upstream to the Cloud (e.g., to an application running on a computer or server in the Cloud) is received (e.g., from another Mobile AP, etc.). The received data is stored at block 1420.

The example method 1400 may, at block 1450, propagate the data to other Mobile APs, for example to increase the odds that some carrier of the data will encounter a network (e.g., a Wi-Fi hotspot and/or a vehicle network Fixed AP) over which the data can be communicated. Block 1450 may comprise performing such propagation in any of a variety of manners. For example, block 1450 may comprise determining how many Mobile APs and/or determining which APs to send the data. There may, for example, be a target (or maximum) number of Mobile APs based on hop count. For example, in a scenario in which a Mobile AP was a single-hop recipient of the data, the Mobile AP may communicate the data to N (e.g., 3 or 4, etc.) other Mobile APs. Also for example, in a scenario in which a Mobile AP was a second-hop recipient of the data (e.g., receiving the data from another Mobile AP), the Mobile AP may communicate the data to M (e.g., 1 or 2) other Mobile APs. Additionally for example, in a scenario in which a Mobile AP was a third-hop recipient of the data, the Mobile AP might determine that it is not allowed by the propagation protocol to further propagate the data.

Until the time threshold $T_3$ is exceeded (e.g., as discussed with regard to FIG. 13) and if the data has not yet been successfully communicated, then the method 1400 may, at block 1460, comprise continuing to attempt to utilize a Wi-Fi hotspot or the vehicle network to communicate the data, whichever is available first. Note that in this case, a plurality of other Mobile APs may be similarly attempting to communicate the same data to the same ultimate destination. For example, if any of the Mobile APs detects a Wi-Fi hotspot through which the Mobile AP may communicate the data to its destination, then the Mobile AP will attempt to communicate the data in such manner. Also for example, if any of the Mobile APs detects a Fixed AP of the vehicle network, then the Mobile AP will attempt to communicate the data in such manner.

If the time threshold $T_3$ is exceeded, then the method 1400 may, at block 1480, comprise clearing (or removing) the data from memory. For example, block 1480 may comprise de-allocating memory that previously stored the data and/or removing a reference to the data from a list of data to communicate. In this example scenario, the node implementing the method 1400 may rely on the original node to utilize the cellular network or some other failover communication method to communicate the data, if the data warrants such treatment.

Also as discussed herein, an ACK packet may be communicated from an immediate recipient of the data and also from the final destination recipient of the data. In a scenario in which an ACK packet or other information indicates to the node that the data has been received at the destination (or at a node that is reliable enough to consider such delivery to be final), the node may cease attempting to communicate the data and remove the data from memory. An example of such operation is shown at block 1475, at which an incoming ACK directs execution flow of the example method 1400 to block 1480 at which the data is cleared from storage. This may, for example, be particularly useful in a scenario in which at block 1450 the data was propagated to a plurality of Mobile APs, each independently attempting to communicate the data to the destination.

Various system diagrams have been presented herein to provide an array of context examples into which systems and methods in accordance with various aspects of this disclosure may be integrated. Another example context is provided at FIG. 15, which shows a block diagram of various components of an example mobile communication network 1500, in accordance with various aspects of the present disclosure.

Figure 15:
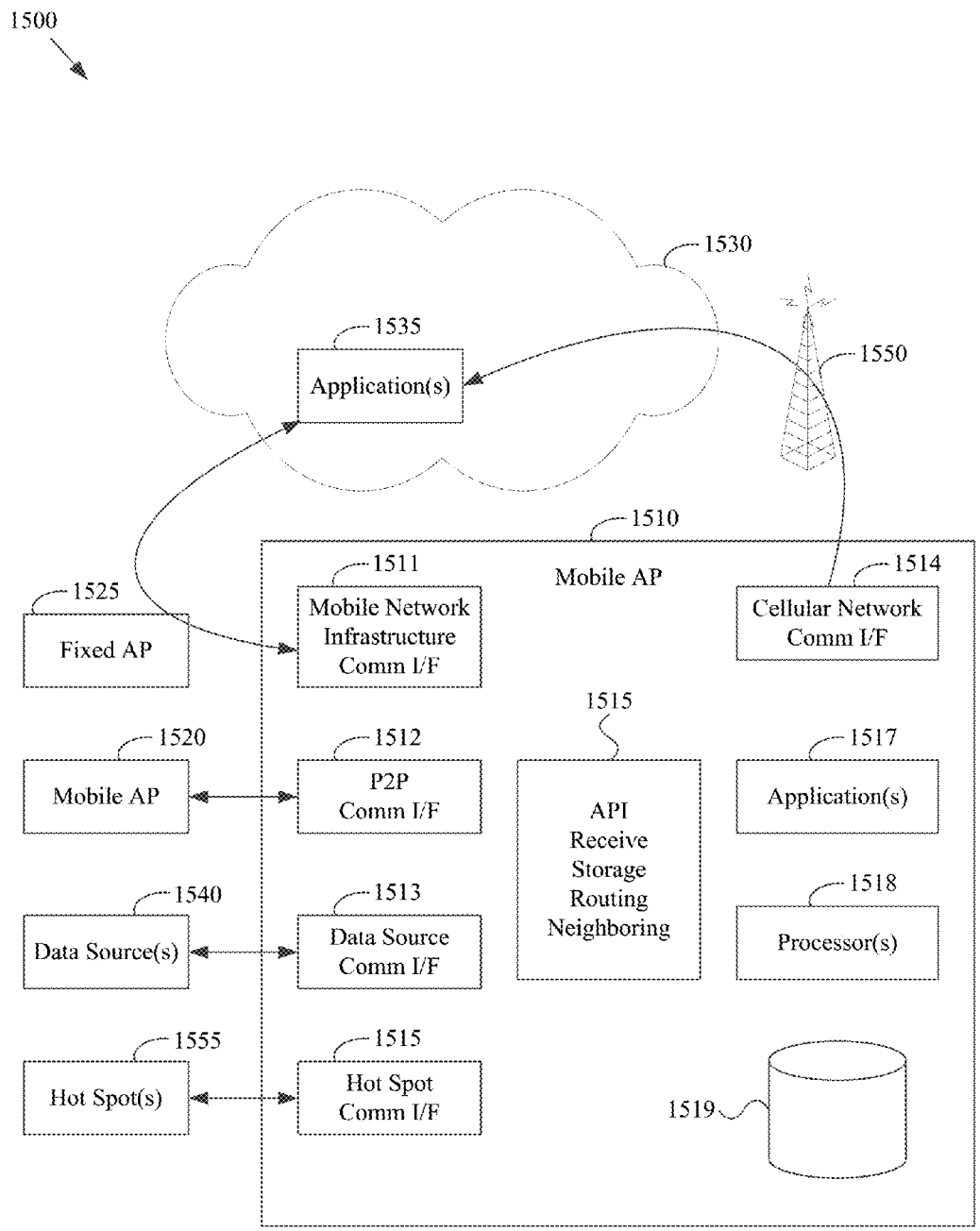
FIG. 15 shows a block diagram of various components of an example mobile communication network, in accordance with various aspects of the present disclosure.

FIG. 15 shows a block diagram of various components of an example communication network 1500 (e.g., a network of moving things) for providing delay tolerant networking (DTN), in accordance with various aspects of the present disclosure. The example system 1500 may, for example, share any or all characteristics with the other example methods, networks and/or network components 100, 200, 300, 400, 500-570, 600, 700, 800, 900, 1000, 1100, 1200, 1300, and 1400, discussed herein. For example, any or all of the components of the example network 1500 may perform any or all of the method steps presented herein.

The example network 1500 comprises a Cloud 1530, which in turn may comprise any of a variety of servers and/or nodes executing applications. An example Cloud-based Application 1535 is shown. In an example implementation, the Application(s) 1535 may operate at a source and/or destination for data as discussed herein. For example, one or more memory devices of a Cloud computer or server may, for example, comprise a non-transitory computer-readable medium that comprises software instructions that when executed by one or more processors, cause the Cloud computer or server to perform any or all of the functionality discussed herein.

The example network 1500 also comprises a Mobile AP 1510, a second Mobile AP 1520, and a Fixed AP 1525. The example network 1500 further comprises one or more data sources 1540 (e.g., sensors, user client devices, etc.).

The example Mobile AP 1510 comprises a Mobile (e.g., Vehicle) Network Communication Interface (I/F) Module 1511 that is operable to communicate with a communication network (e.g., infrastructure components, Cloud components, Fixed APs, etc.). The Mobile Network Comm I/F Module 1511 may, for example, operate to communicate in accordance with any of a variety of communication protocols (e.g., 802.11p, cellular, etc.). In an example scenario, the Mobile AP 1510 utilizes the Mobile Network Comm I/F Module 1511 to communicate with a server in the Cloud 1530 that is operating in accordance with the Cloud-based Application(s) 1535. The Mobile Network Comm I/F Module 1511 may, for example, communicate with such server via a Fixed AP 1525 and/or any of a variety of intermediate nodes. For example, any of the example communications discussed herein between a Mobile AP and a Fixed AP, network infrastructure node, cloud component, etc., may be performed utilizing the Mobile Network Comm I/F Module 1511.

The example Mobile AP 1510 comprises a Peer-to-Peer (P2P) Communication Interface (I/F) Module 1511 that is operable to communicate with peer nodes (e.g., Mobile APs, etc.). The P2P Comm I/F Module 1512 may, for example, operate to communicate in accordance with any of a variety of communication protocols (e.g., 802.11p, cellular, Wi-Fi, etc.). In an example scenario, the Mobile AP 1510 utilizes the P2P Comm I/F Module 1512 to communicate with one or more other Mobile APs (and/or Fixed APs) in the network 1500. The P2P Comm I/F Module 1512 may, for example, communicate with a peer node 1520 directly, via an intermediate Fixed AP 1525, via any one or more of a variety of intermediate nodes, etc. For example, any of the example communication discussed herein between a Mobile AP and another Mobile AP, etc., may be performed utilizing the P2P Comm I/F Module 1512.

The example Mobile AP 1510 comprises a Data Source Communication Interface (I/F) Module 1513 that is operable to communicate with data sources (e.g., sensor systems, general data sources, user client devices, etc.). The Data Source Comm I/F Module 1513 may, for example, operate to communicate in accordance with any of a variety of communication protocols (e.g., Wi-Fi, Bluetooth, UWB, cellular, wired interface, etc.). In an example scenario, the Mobile AP 1510 utilizes the Data Source Comm I/F Module 1513 to communicate with one or more other data sources (e.g., sensors, general data sources, etc.) in the network 1500. The Data Source Comm I/F Module 1513 may, for example, communicate with a sensor directly, via any one or more of a variety of intermediate nodes, etc. For example, any of the example communication discussed herein between a Mobile AP and a data source, etc., may be performed utilizing the Data Source Comm I/F Module 1513.

The example Mobile AP 1510 comprises a Cellular Network Communication Interface Module 1514 that is operable to communicate with one or more cellular networks (e.g., via a cellular base station 1550, etc.). The Cellular Network Comm I/F Module 1514 may, for example, operate to communicate in accordance with any of a variety of cellular communication protocols (e.g., LTE, 3G protocols, etc.). For example, any of the example cellular communication discussed herein between a Mobile AP and the cellular network may be performed utilizing the Cellular Network Comm I/F Module 1514.

The example Mobile AP 1510 comprises a Hot Spot Communication Interface Module 1515 that is operable to communicate with one or more hot spots 1555 (e.g., public and/or private Wi-Fi hot spots, etc.). The Hot Spot Comm I/F Module 1515 may, for example, operate to communicate in accordance with any of a variety of hot spot protocols (e.g., Wi-Fi, etc.). For example, any of the example hot spot communication discussed herein between a Mobile AP and a hot spot may be performed utilizing the Hot Spot Comm I/F Module 1515.

The example Mobile AP 1510 comprises various modules 1515 that are operable to perform (or manage) any or all of the functionality discussed herein. Such modules 1515 may, for example, share any or all characteristics with the modules shown in the example system 800 of FIG. 8. Such modules 1515 may, for example, operate to perform any or all of the DTN-related functionality discussed herein (e.g., utilizing the various communication interface modules 1511, 1512, 1513, and 1514. For example, the modules 1515 may comprise an API module that operates to perform any or all of the API functionality discussed herein. Also for example, the modules 1515 may comprise a Receive module that operates to perform any or all of the data receiving functionality discussed herein (e.g., utilizing any or all of the communication interface modules 1511, 1512, 1513, and 1514). Additionally for example, the modules 1515 may comprise a Storage module that operates to perform any or all of the data storage functionality discussed herein (e.g., utilizing the Memory Device(s) 1519). Further for example, the modules 1515 may comprise a Routing module that operates to perform any or all of the data routing (or communicating) functionality discussed herein (e.g., utilizing any or all of the communication interface modules 1511, 1512, 1513, and 1514). Still further for example, the modules 1515 may comprise a Neighboring module that operates to perform any or all of the functionality discussed herein with regard to maintaining an accurate list of neighboring nodes of a node.

The example Mobile AP 1510 may also comprise one or more Applications 1517. Such Applications may, for example, request and/or utilize and/or provide data, the communication of which is managed by the various modules 1515. In an example scenario, an Application 1517 may comprise an on-board application of the Mobile AP 1510 that operates to request and/or receive collected data from external data sources (e.g., sensors, user client devices, etc.). Such Application 1517 may, for example, communicate with a counterpart (or central) application in the Cloud 1530.

The example Mobile AP 1510 may also comprise one or more Processors 1518 and Memory Devices 1519. The Processor(s) 1518 may, for example, comprise any of a variety of processor characteristics. For example, the Processor(s) 1518 may comprise one or more of a general purposes processor, RIS processor, microcontroller, ASIC, DSP, video processor, etc.). The Memory Device(s) 1519 may, for example comprise any of a variety of memory characteristics. For example, the Memory Device(s) 1519 may comprise a volatile memory, non-volatile memory, etc. The Memory Device(s) 1519 may, for example, comprise a non-transitory computer-readable medium that comprises software instructions that when executed by the Processor(s) 1518, cause the Mobile AP 1210 to perform any or all of the functionality discussed herein (e.g., with regard to the example methods discussed herein, etc.). The Memory Device(s) 1519 may, for example, be utilized by a Storage module of the various modules 1515 for storing data.

Note that the second Mobile AP 1520, the Fixed AP 1525, and/or any of a variety of network nodes may comprise configurations that share any or all aspects with the example Mobile AP 1510.

In general, the systems and methods presented herein provide a variety of benefits. For example, cost to transport data to and/or from the cloud is reduced. The reliance on and/or utilization of cellular network bandwidth is reduced. Flexibility is provided regarding data delivery requirements, providing for low cost communication when allowed. Free or low-cost communication pathways are leveraged to the extent possible. Delay tolerant networking is provided with the capability to utilize the cellular network as a fault-back mechanism for data that must be communicated reliably. Also, communication resources may be directed toward immediate communication needs and away from communication that can be delayed.

In an example implementation of a vehicle communication network, a considerable amount of non real-time data may need to be collected and/or disseminated. Acceptable delivery times for such data to the destination may range from minutes, to hours, etc. Such data may, for example, comprise sensor data, advertisement information, multimedia information, etc. A communication network implemented in accordance with various aspects of this disclosure provides for such operation in an efficient manner, for example with regard to cost, bandwidth utilization, etc.

In general, the systems and methods presented herein, in accordance with various aspects of the present disclosure, adapt the rules (or strategy or plan) by which data is gathered. Such adaptability may, for example, be performed in a distributed fashion. For example, the determining plans for collecting data as well as the actual collection of the data may be performed in a distributed manner. In an example implementation, a combination of central control and distributed control of data collection activities may be utilized. In an example implementation, control of data collection activities may be generally completely distributed among the data collecting nodes themselves with a minimal amount of central oversight.

The manner in which data is collected may thus be optimized based on any or a large number of considerations, for example regarding environment, network operation, overall context, individual node contexts, etc. Any or all nodes of the system may provide information relevant to the collection of data by the network nodes.

In a network implementation in accordance with various aspects of the present disclosure, a network of moving things may be utilized as a flexible and efficient backbone for sensor data communication. Such a network may provide the needs of any of a variety of organizations, for example business enterprises, municipalities, infrastructure maintenance organizations, security organizations, etc.

In an example implementation, mobile-to-mobile communication links may be utilized to share control information between nodes, to share collected data between nodes, to share storage, processing, and/or communication responsibilities for such collected data, etc.

Though this disclosure generally discussed the collection of data from data sources, it should be readily understood that the scope of this disclosure also applies to the communication of information to the data sources. For example, any or all of the network components discussed herein may be utilized to share collected data between data sources, to communicate other data (e.g., control or configuration information, program update information, etc.) to the data sources (e.g., sensor systems, etc.), etc. Such reverse communication may also be incorporated into any or all aspects of the data collection (or communication) planning discussed herein.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for optimizing data communication in a network of moving things. As non-limiting examples, various aspects of this disclosure provide systems and methods for communicating delay tolerant information in a network of moving things, for example comprising any of a variety of types of vehicles (e.g., autonomous vehicles, vehicles controlled by local operators, vehicles controlled by remote operators, etc.). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communication network mobile access point (MAP) comprising:
at least one module operable to, at least:
receive a data packet;
during a first time period, first attempt to communicate the data packet to a destination through at least a first type of communication network access point; and
during a second time period after the first time period, second attempt to communicate the data packet to the destination through at least a second type of communication network access point, wherein the at least a first type of communication network access point does not include the second type of communication network access point, wherein:
- the at least a first type of communication network access point comprises a Fixed AP type of access point of a vehicle communication network but not a Mobile AP type of access point of the vehicle communication network; and
- the at least a second type of communication network access point comprises the Mobile AP type of access point of the vehicle communication network.

2. The mobile access point (MAP) of claim 1, wherein the at least one module is operable to second attempt to communicate the data packet to the destination through the at least a second type of communication network access point during the second time period only if the data packet is not successfully communicated during the first attempt.

3. A communication network mobile access point (MAP) comprising:
- at least one module operable to, at least:
  - receive a data packet;
  - during a first time period, first attempt to communicate the data packet to a destination through at least a first type of communication network access point; and
  - during a second time period after the first time period, second attempt to communicate the data packet to the destination through at least a second type of communication network access point, wherein the at least a first type of communication network access point does not include the second type of communication network access point,
- wherein the at least one module is operable to second attempt to communicate the data packet to the destination through the at least a second type of communication network access point during the second time period only if the data packet is not successfully communicated during the first attempt, and
- wherein the at least one module is operable to determine whether to second attempt to communicate the data packet to the destination through the at least a second type of communication network access point during the second time period based, at least in part, on contents of the data packet.

4. The mobile access point (MAP) of claim 1, wherein the second time period immediately follows the first time period.

5. A communication network mobile access point (MAP) comprising:
- at least one module operable to, at least:
  - receive a data packet;
  - during a first time period, first attempt to communicate the data packet to a destination through at least a first type of communication network access point; and
  - during a second time period after the first time period, second attempt to communicate the data packet to the destination through at least a second type of communication network access point, wherein the at least a first type of communication network access point does not include the second type of communication network access point,
- wherein the at least a second type of communication network access point comprises the first type of communication network access point.

6. A communication network mobile access point (MAP) comprising:
- at least one module operable to, at least:
  - receive a data packet;
  - during a first time period, first attempt to communicate the data packet to a destination through at least a first type of communication network access point; and
  - during a second time period after the first time period, second attempt to communicate the data packet to the destination through at least a second type of communication network access point, wherein the at least a first type of communication network access point does not include the second type of communication network access point,
- wherein the first type of communication network access point comprises a Wi-Fi hotspot that is not part of a vehicle communication network, and the second type of communication network access point comprises an access point of the vehicle communication network.

7. The mobile access point (MAP) of claim 1, wherein the at least one module is operable to, during a third time period after the second time period, attempt to communicate the data packet to the destination through at least a third type of communication network access point, wherein the at least a first type of communication network access point does not include the third type of communication network access point, and the at least a second type of communication network access point does not include the third type of communication network access point.

8. A communication network mobile access point (MAP) comprising:
- at least one module operable to, at least:
  - receive a data packet;
  - during a first time period, first attempt to communicate the data packet to a destination through at least a first type of communication network access point; and
  - during a second time period after the first time period, second attempt to communicate the data packet to the destination through at least a second type of communication network access point, wherein the at least a first type of communication network access point does not include the second type of communication network access point,
- wherein the at least one module is operable to, during a third time period after the second time period, attempt to communicate the data packet to the destination through at least a third type of communication network access point, wherein the at least a first type of communication network access point does not include the third type of communication network access point, and the at least a second type of communication network access point does not include the third type of communication network access point.

9. The mobile access point (MAP) of claim 8, wherein:
- the at least a second type of communication network access point comprises a Fixed AP type of access point of a vehicle communication network but not a Mobile AP type of access point of the vehicle communication network; and
- the at least a third type of communication network access point comprises the Mobile AP type of access point of the vehicle communication network.

10. The mobile access point (MAP) of claim 9, wherein the at least a first type of communication network access point comprises a Wi-Fi hotspot that is not part of the vehicle communication network.

11. The mobile access point (MAP) of claim 8, wherein:
- the at least a first type of communication network access point comprises a Wi-Fi hotspot that is not part of a vehicle communication network;

the at least a second type of communication network access point comprises an access point of the vehicle communication network; and the at least a third type of communication network access point comprises a cellular communication network base station.

12. A communication network mobile access point (MAP) comprising:
at least one module operable to, at least:
receive a data packet;
during a first time period, first attempt to communicate the data packet to a destination through at least a first type of communication network access point;
if the data packet is not successfully communicated during the first time period, then:
if the data packet is a first type of data packet then stop attempting to communicate the data packet; and
if the data packet is a second type of data packet, then during a second time period after the first time period, second attempt to communicate the data packet to the destination through at least a second type of communication network access point, wherein the at least a first type of communication network access point does not include the second type of communication network access point.

13. The mobile access point (MAP) of claim 12, wherein the at least a second type of communication network access point comprises the first type of communication network access point.

14. The mobile access point (MAP) of claim 12, wherein the first type of communication network access point comprises a Wi-Fi hotspot that is not part of a vehicle communication network, and the second type of communication network access point comprises an access point of the vehicle communication network.

15. The mobile access point (MAP) of claim 12, wherein:
the at least a first type of communication network access point comprises a Fixed AP type of access point of a vehicle communication network but not a Mobile AP type of access point of the vehicle communication network; and
the at least a second type of communication network access point comprises the Mobile AP type of access point of the vehicle communication network.

16. The mobile access point (MAP) of claim 12, wherein the at least one module is operable to, if the data packet is not successfully communicated during the second time period, then during a third time period after the second time period, attempt to communicate the data packet to the destination through at least a third type of communication network access point, wherein the at least a first type of communication network access point does not include the third type of communication network access point, and the at least a second type of communication network access point does not include the third type of communication network access point.

17. The mobile access point (MAP) of claim 16, wherein:
the at least a second type of communication network access point comprises a Fixed AP type of access point of a vehicle communication network but not a Mobile AP type of access point of a vehicle communication network; and
the at least a third type of communication network access point comprises the Mobile AP type of access point of the vehicle communication network.

18. The mobile access point (MAP) of claim 17, wherein the at least a first type of communication network access point comprises a Wi-Fi hotspot that is not part of the vehicle communication network.

19. The mobile access point (MAP) of claim 16, wherein:
the at least a first type of communication network access point comprises a Wi-Fi hotspot that is not part of a vehicle communication network;
the at least a second type of communication network access point comprises an access point of the vehicle communication network; and
the at least a third type of communication network access point comprises a cellular communication network base station.

20. The mobile access point of claim 1, wherein the at least one module is operable to, at least:
first attempt to receive a plurality of incoming data packets from a first other MAP; and
if the first attempt to receive the plurality of incoming data packets from the first other MAP fails for a failed set of data packets of the plurality of incoming data packets, then second attempt to receive the failed set of data packets from a second other MAP.

21. The mobile access point (MAP) of claim 20, wherein the at least one module is operable to perform the second attempt to receive the failed set of data packets while the second other MAP is within communication range of the MAP and the first other MAP is not within communication range of the MAP.

22. The mobile access point (MAP) of claim 20, wherein the second attempt to receive the failed set of data packets comprises communicating with the second other MAP to determine whether the second other MAP has the failed set of data packets.

23. The mobile access point (MAP) of claim 20, wherein the at least one module is operable to determine whether to perform the second attempt to receive the failed set of data packets based at least in part on vehicle location information.

24. The mobile access point (MAP) of claim 23, wherein the at least one module is operable to communicate with an autonomous vehicle control system to obtain the vehicle location information.

* * * * *